(12) United States Patent
Bao et al.

(10) Patent No.: US 11,678,348 B2
(45) Date of Patent: Jun. 13, 2023

(54) SIDELINK-ASSISTED INFORMATION TRANSFER

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Taesang Yoo, San Diego, CA (US); Hamed Pezeshki, San Diego, CA (US); Arumugam Chendamarai Kannan, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/159,502

(22) Filed: Jan. 27, 2021

(65) Prior Publication Data
US 2021/0243752 A1    Aug. 5, 2021

Related U.S. Application Data

(60) Provisional application No. 62/968,939, filed on Jan. 31, 2020.

(51) Int. Cl.
*H04W 72/04*    (2023.01)
*H04W 72/20*    (2023.01)
*H04W 72/51*    (2023.01)

(52) U.S. Cl.
CPC ........... *H04W 72/51* (2023.01); *H04W 72/20* (2023.01)

(58) Field of Classification Search
None
See application file for complete search history.

(56) References Cited

U.S. PATENT DOCUMENTS 10,116,455 B2 * 10/2018 Rubin ............... H04J 11/005
10,631,263 B2 *  4/2020 Koo ................. H04W 64/003
(Continued)

FOREIGN PATENT DOCUMENTS

EP           3444962 A1    2/2019
WO    WO-2019145095 A1    8/2019

OTHER PUBLICATIONS

International Search Report and Written Opinion—PCT/US2021/015435—ISA/EPO—dated Jun. 15, 2021.
(Continued)

*Primary Examiner* — Hong S Cho
(74) *Attorney, Agent, or Firm* — Norton Rose Fulbright US LLP

(57) ABSTRACT

This disclosure provides systems, methods, devices, and computer-readable media that support base station-assisted and unassisted sharing of particular information between neighboring user equipments (UEs). In a particular implementation, a method of wireless communication includes receiving, at a base station from a first UE, an information request corresponding to neighbor UEs of the first UE. The method also includes retrieving, at the base station from one or more serving UEs, corresponding information. The method further includes transmitting, from the base station to the first UE, an information package that includes the information corresponding to at least one of the one or more serving UEs. Other aspects and features are also claimed and described.

29 Claims, 10 Drawing Sheets

(56) References Cited

U.S. PATENT DOCUMENTS

| | | | |
|---|---|---|---|
| 10,827,380 B2* | 11/2020 | Rao | H04W 76/14 |
| 10,980,006 B2* | 4/2021 | Agiwal | H04W 72/0413 |
| 2012/0157121 A1* | 6/2012 | Li | G01S 5/02 |
| | | | 455/456.2 |
| 2013/0045759 A1 | 2/2013 | Smith | |
| 2016/0014727 A1* | 1/2016 | Nimbalker | H04L 1/0038 |
| | | | 370/329 |
| 2017/0332192 A1* | 11/2017 | Edge | G01S 5/0036 |
| 2018/0227023 A1* | 8/2018 | Kim | H04W 16/28 |
| 2019/0364492 A1 | 11/2019 | Azizi et al. | |

OTHER PUBLICATIONS

Partial International Search Report—PCT/US2021/015435—ISA/EPO—dated Apr. 23, 2021.

* cited by examiner

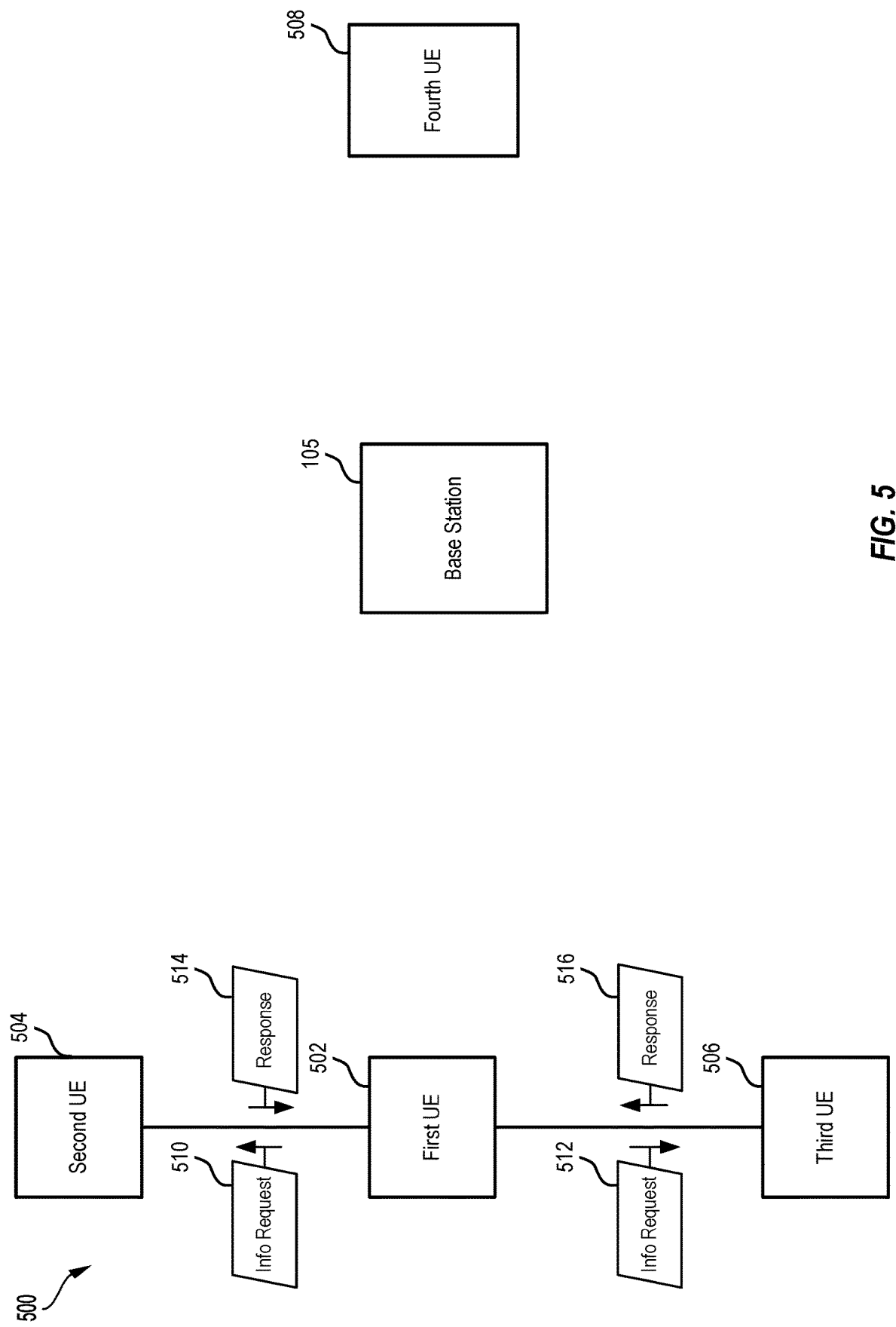

SIDELINK-ASSISTED INFORMATION TRANSFER

CROSS-REFERENCE TO RELATED APPLICATIONS

This application claims the benefit of U.S. Provisional Patent Application No. 62/968,939, entitled, "SIDELINK-ASSISTED INFORMATION TRANSFER," filed on Jan. 31, 2020, the disclosure of which is hereby incorporated by reference herein in its entirety as if fully set forth below and for all applicable purposes.

TECHNICAL FIELD

Aspects of the technology discussed below relate generally to wireless communication systems, and more particularly, to wireless communication systems that enable sidelink-assisted information transfer. The discussed techniques can enable and provide user equipments (UEs) with information for performing one or more operations, which improves the functionality of the UEs.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, at a base station from a first user equipment (UE), an information request corresponding to neighbor UEs of the first UE. The method also includes retrieving, at the base station from one or more serving UEs, corresponding information. The method further includes transmitting, from the base station to the first UE, an information package that includes the information corresponding to at least one of the one or more serving UEs.

In an additional aspect of the disclosure, an apparatus configured for wireless communication is disclosed. The apparatus includes at least one processor, and a memory coupled to the at least one processor. The at least one processor is configured to receive, at a base station from a first user equipment (UE), an information request corresponding to neighbor UEs of the first UE. The at least one processor is also configured to retrieve, at the base station from one or more serving UEs, corresponding information. The at least one processor is further configured to initiate transmission, from the base station to the first UE, of an information package that includes the information corresponding to at least one of the one or more serving UEs.

In an additional aspect of the disclosure, an apparatus configured for wireless communication is disclosed. The apparatus includes means for receiving, at a base station from a first user equipment (UE), an information request corresponding to neighbor UEs of the first UE. The apparatus also includes means for retrieving, at the base station from one or more serving UEs, corresponding information. The apparatus further includes means for transmitting, from the base station to the first UE, an information package that includes the information corresponding to at least one of the one or more serving UEs.

In an additional aspect of the disclosure, a non-transitory computer-readable medium stores instructions that, when executed by a processor, cause the processor to perform operations. The operations include receiving, at a base station from a first user equipment (UE), an information request corresponding to neighbor UEs of the first UE. The operations also include retrieving, at the base station from one or more serving UEs, corresponding information. The operations further include initiating transmission, from the base station to the first UE, of an information package that includes the information corresponding to at least one of the one or more serving UEs.

In an additional aspect of the disclosure, a method of wireless communication includes transmitting, from a first user equipment (UE) to a base station, an information request corresponding to neighbor UEs of the first UE. The method further includes receiving, at the first UE from the base station, an information package that includes information corresponding to one or more neighbor UEs of the first UE.

In an additional aspect of the disclosure, an apparatus configured for wireless communication is disclosed. The apparatus includes at least one processor, and a memory coupled to the at least one processor. The at least one processor is configured to initiate transmission, from a first user equipment (UE) to a base station, of an information request corresponding to neighbor UEs of the first UE. The at least one processor is further configured to receive, at the first UE from the base station, an information package that includes information corresponding to one or more neighbor UEs of the first UE.

In an additional aspect of the disclosure, an apparatus configured for wireless communication is disclosed. The apparatus includes means for transmitting, from a first user equipment (UE) to a base station, an information request corresponding to neighbor UEs of the first UE. The apparatus further includes means for receiving, at the first UE from the base station, an information package that includes information corresponding to one or more neighbor UEs of the first UE.

In an additional aspect of the disclosure, a non-transitory computer-readable medium stores instructions that, when executed by a processor, cause the processor to perform operations. The operations include initiating transmission, from a first user equipment (UE) to a base station, of an information request corresponding to neighbor UEs of the first UE. The operations further include receiving, at the first UE from the base station, an information package that includes information corresponding to one or more neighbor UEs of the first UE.

In an additional aspect of the disclosure, a method of wireless communication includes receiving, at a base station from a first user equipment (UE), an information request corresponding to neighbor UEs of the first UE. The method also includes determining, at the base station, one or more neighbor UEs of the first UE from one or more serving UEs of the base station responsive to receiving the information request. The method further includes transmitting, from the base station to the first UE, a list of the one or more neighbor UEs to enable sidelink communications between the first UE and the one or more neighbor UEs.

In an additional aspect of the disclosure, an apparatus configured for wireless communication is disclosed. The apparatus includes at least one processor, and a memory coupled to the at least one processor. The at least one processor is configured to receive, at a base station from a first user equipment (UE), an information request corresponding to neighbor UEs of the first UE. The at least one processor is also configured to determine, at the base station, one or more neighbor UEs of the first UE from one or more serving UEs of the base station responsive to receiving the information request. The at least one processor is further configured to initiate transmission, from the base station to the first UE, of a list of the one or more neighbor UEs to enable sidelink communications between the first UE and the one or more neighbor UEs.

In an additional aspect of the disclosure, an apparatus configured for wireless communication is disclosed. The apparatus includes means for receiving, at a base station from a first user equipment (UE), an information request corresponding to neighbor UEs of the first UE. The apparatus also includes means for determining, at the base station, one or more neighbor UEs of the first UE from one or more serving UEs of the base station responsive to receiving the information request. The method further includes means for transmitting, from the base station to the first UE, a list of the one or more neighbor UEs to enable sidelink communications between the first UE and the one or more neighbor UEs.

In an additional aspect of the disclosure, a non-transitory computer-readable medium stores instructions that, when executed by a processor, cause the processor to perform operations. The operations include receiving, at a base station from a first user equipment (UE), an information request corresponding to neighbor UEs of the first UE. The operations also include determining, at the base station, one or more neighbor UEs of the first UE from one or more serving UEs of the base station responsive to receiving the information request. The operations further include initiating transmission, from the base station to the first UE, of a list of the one or more neighbor UEs to enable sidelink communications between the first UE and the one or more neighbor UEs.

In an additional aspect of the disclosure, a method of wireless communication includes transmitting, from a first user equipment (UE) to a base station, an information request corresponding to neighbor UEs of the first UE. The method also includes receiving, at the first UE from the base station, a list of one or more neighbor UEs to the first UE. The method further includes establishing, at the first UE, one or more sidelink connections with the one or more neighbor UEs.

In an additional aspect of the disclosure, an apparatus configured for wireless communication is disclosed. The apparatus includes at least one processor, and a memory coupled to the at least one processor. The at least one processor is configured to initiate transmission, from a first user equipment (UE) to a base station, of an information request corresponding to neighbor UEs of the first UE. The at least one processor is also configured to receive, at the first UE from the base station, a list of one or more neighbor UEs to the first UE. The at least one processor is further configured to establish, at the first UE, one or more sidelink connections with the one or more neighbor UEs.

In an additional aspect of the disclosure, an apparatus configured for wireless communication is disclosed. The apparatus includes means for transmitting, from a first user equipment (UE) to a base station, an information request corresponding to neighbor UEs of the first UE. The apparatus also includes means for receiving, at the first UE from the base station, a list of one or more neighbor UEs to the first UE. The method further includes means for establishing, at the first UE, one or more sidelink connections with the one or more neighbor UEs.

In an additional aspect of the disclosure, a non-transitory computer-readable medium stores instructions that, when executed by a processor, cause the processor to perform operations. The operations include initiating transmission, from a first user equipment (UE) to a base station, of an information request corresponding to neighbor UEs of the first UE. The operations also include receiving, at the first UE from the base station, a list of one or more neighbor UEs to the first UE. The operations further include establishing, at the first UE, one or more sidelink connections with the one or more neighbor UEs.

In an additional aspect of the disclosure, a method of wireless communication includes establishing, at a first user equipment (UE), one or more sidelink connections with one or more neighbor UEs of the first UE. The method also includes requesting, from the first UE to the one or more neighbor UEs via the one or more sidelink connections, information from the one or more neighbor UEs. The method further includes performing, at the first UE, one or more operations based on the information received from the one or more neighbor UEs.

In an additional aspect of the disclosure, an apparatus configured for wireless communication is disclosed. The apparatus includes at least one processor, and a memory coupled to the at least one processor. The at least one processor is configured to establish, at a first user equipment (UE), one or more sidelink connections with one or more neighbor UEs of the first UE. The at least one processor is also configured to request, from the first UE to the one or more neighbor UEs via the one or more sidelink connections, information from the one or more neighbor UEs. The at least one processor is further configured to perform, at the first UE, one or more operations based on the information received from the one or more neighbor UEs.

In an additional aspect of the disclosure, an apparatus configured for wireless communication is disclosed. The apparatus includes means for establishing, at a first user equipment (UE), one or more sidelink connections with one or more neighbor UEs of the first UE. The apparatus also includes means for requesting, from the first UE to the one or more neighbor UEs via the one or more sidelink connections, information from the one or more neighbor UEs. The apparatus further includes means for performing, at the first UE, one or more operations based on the information received from the one or more neighbor UEs.

In an additional aspect of the disclosure, a non-transitory computer-readable medium stores instructions that, when executed by a processor, cause the processor to perform operations. The operations include establishing, at a first user equipment (UE), one or more sidelink connections with one or more neighbor UEs of the first UE. The operations also include requesting, from the first UE to the one or more neighbor UEs via the one or more sidelink connections, information from the one or more neighbor UEs. The operations further include performing, at the first UE, one or more operations based on the information received from the one or more neighbor UEs.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a block diagram illustrating an example wireless communication system that supports sidelink-assisted retrieval of information to a UE according to one or more aspects.

DETAILED DESCRIPTION

Figure 1:
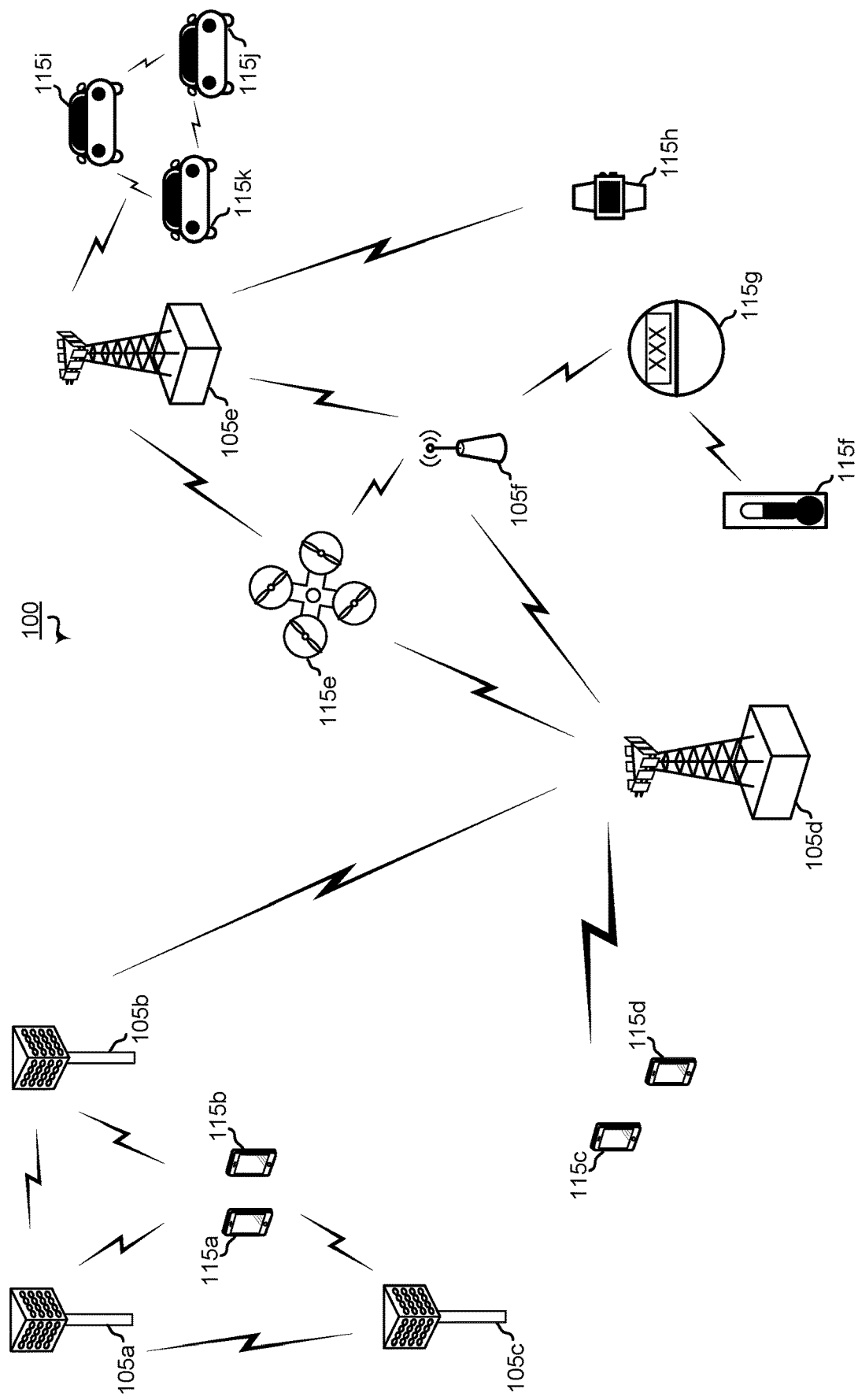
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the disclosed subject matter. It will be apparent to those skilled in the art that these specific details are not required in every case and that, in some instances, well-known structures and components are shown in block diagram form for clarity of presentation.

In 5th Generation (5G) wireless communication systems, the propagation environment may indicate that particular information may be shared (e.g., transferable) between user equipments (UEs) within short distances of each other because the environment of the UEs is similar. For example, information such as angle of arrival (AoA), angle of departure (AoD), etc. may be the same (or similar) for two UEs that are nearby each other and are configured for using millimeter wave (mmWave) communications. However, not all UEs are capable of determining the particular information. Even if a UE is capable of determining the particular information, determination of the particular information by the UE may increase power consumption at the UE.

The present disclosure provides systems, apparatus, methods, and computer-readable media for sharing information between UEs in a similar environment (e.g., neighboring UEs). The information may be shared by a base station or may be shared between UEs using sidelink connections (e.g., the information may be communicated on a sidelink between the UEs). In some implementations, a first UE may transmit an information request to a base station, and the base station may determine neighboring UEs to the first UE and retrieve the corresponding information (e.g., information responsive to the information request from the first UE) from the neighboring UEs for providing to the first UE. The base station may determine the neighboring UEs based on information inferred at the base station (e.g., beam locations, UE trajectories, etc.), information retrieved from another network component (e.g., position information from a location management function (LMF) or other component), or position information retrieved from or reported by serving UEs of the base station. In some other implementations, the base station may determine the neighboring UEs of the first UE and send a list of the neighboring UEs to the first UE, such that the first UE may form sidelink connections with the neighboring UEs and retrieve the corresponding information. In some other implementations, the first UE may form sidelink connections with neighboring UEs without assistance from a base station, and the first UE may retrieve the corresponding information from the neighboring UEs via the sidelink connections. The information may include beam selection data, angle of arrival (AoA) data, angle of departure (AoD) data, zenith angle of arrival (ZoA) data, zenith angle of departure (ZoD) data, position data, velocity data, channel information, quasi co-location (QCL) data, Doppler spread data, Doppler shift data, delay profile data, delay spread data, any other information that could be used at the first UE, or a combination thereof. The first UE may use the information to perform one or more operations, such as estimating a position of the first UE, estimating a speed of the first UE, selecting one or more candidate beams of a base station, selecting a candidate channel for communication with a base station, other operations, or a combination thereof, as non-limiting examples.

Knowledge transfer (e.g., information sharing) correlation between sidelink (SL) terminals, such as UEs, can depend on several factors (e.g., velocity, pathloss, etc.). Some such factors may be very correlated, as compared to other factors that are be less correlated. Knowledge transfer (e.g., angle data, position data, velocity data, channel information, Doppler data, delay data, etc.) using conventional messaging consumes system capacity and raises the probability for congestion in a wireless communication system. Although this is always a possibility for any kind of control overhead reporting, there are ways to mitigate the capacity consumption and the increased congestion. For example, as described herein, the reports (e.g., the knowledge transfer or sharing) may be staggered, the periodicity of the reports may be reduced, or the like. Also in large bandwidth (BW) systems, such as mmWave, and/or high data rate applications like video or multimedia, the volume of messaging to support the knowledge transfer may be negligible compared to the typical data volume. Aspects disclosed herein may also include machine learning (ML) approaches for a large range of applications. According to some aspects, sharing environmental knowledge (e.g., beam properties, positioning, speed estimation, channel information, etc.) between UEs includes two types of sharing: base station (gNb) assisted and UE assisted. For gNb assisted knowledge sharing, UE grouping is done by the base station, and knowledge is transferred directly by the UE or by a SL according to a grouping list transferred to the UE by the base station. For UE assisted knowledge sharing, a UE connects with neighbor UEs and requests knowledge transfer from the neighbor UEs (e.g., via SL communications).

Particular implementations of the subject matter described in this disclosure may be implemented to realize one or more of the following potential advantages or benefits. In some aspects, the present disclosure provides techniques for enabling a UE to receive useful information related to neighboring base stations without performing power consuming processing operations. For example, instead of a first UE calculating or otherwise determining particular information, the particular information may be retrieved by a base station and provided to the UE. Alternatively, the first UE may form sidelink connections with neighboring UEs, either with assistance from a base station or unassisted, to retrieve the particular information from the neighboring UEs. Sharing the particular information via sidelink communications between the UEs, or from the base station to UEs, enables enhanced functionality at the UEs, may which improve user experience associated with the UEs.

This disclosure relates generally to providing or participating in communication as between two or more wireless devices in one or more wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP LTE is a 3GPP project which was aimed at improving the UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip implementations or other non-module-component based devices (e.g., end-user devices, vehicles, communication devices, computing devices, industrial equipment, retail or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g. radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, a vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include aspects of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, gaming devices, reality modification devices (e.g., extended reality (XR), augmented reality (AR), virtual reality (VR)), entertainment devices, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d as illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink or uplink, or desired transmission between base stations, and backhaul transmissions between base stations. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 can support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
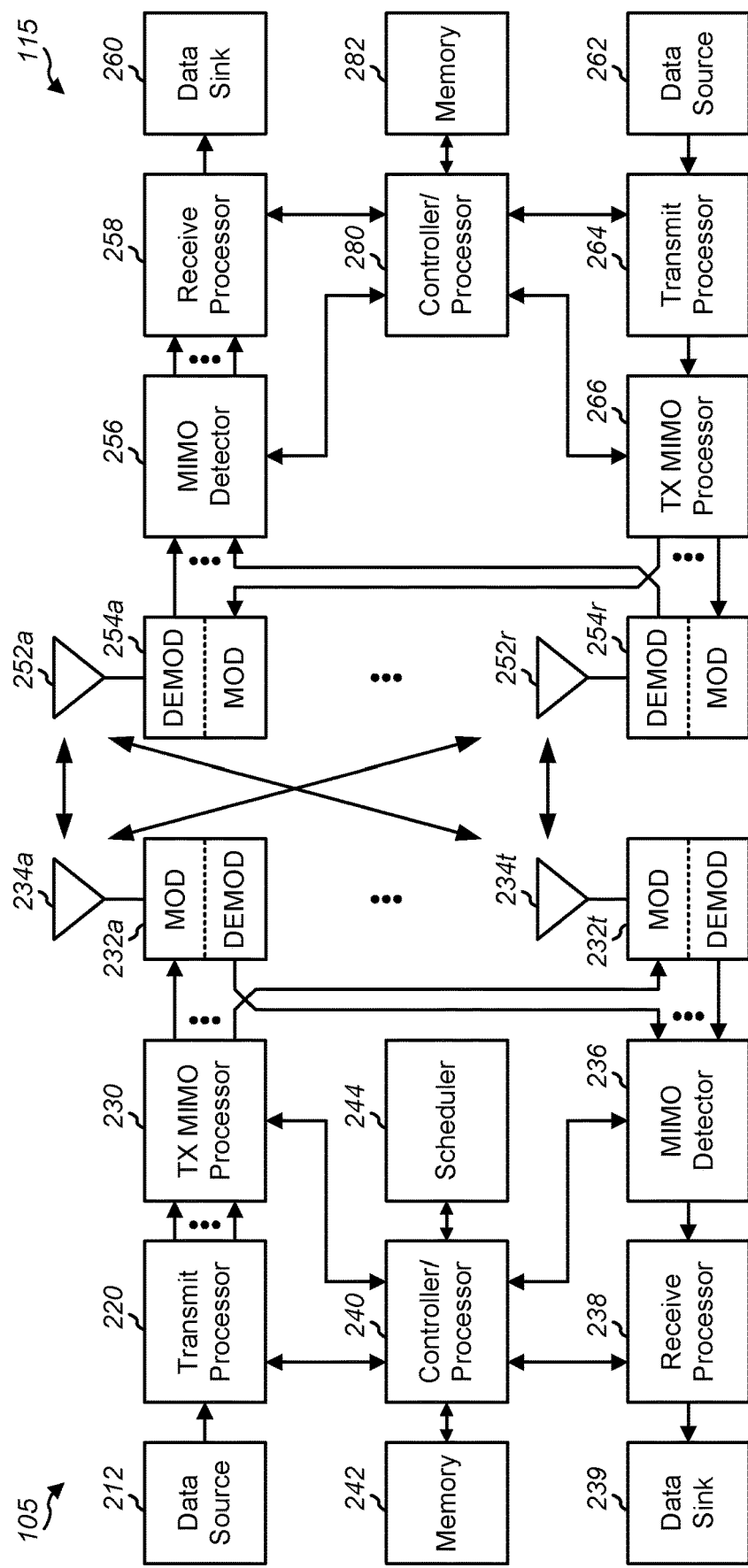
FIG. 2 is a block diagram illustrating examples of a base station and a user equipment (UE) configured according to one or more aspects.

FIG. 2 is a block diagram illustrating examples of a base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller 240, such as a processor. The control information may be for a physical broadcast channel (PBCH), a physical control format indicator channel (PC-FICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller 280, such as a processor.

On the uplink, at the UE 115, a transmit processor 264 may receive and process data (e.g., for a physical uplink shared channel (PUSCH)) from a data source 262 and control information (e.g., for a physical uplink control channel (PUCCH)) from the controller 280. Additionally, transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 6-10, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In 5G communication systems, information at a first UE may be useful to neighboring UEs. For example, nearby UEs (e.g., neighboring UEs) may have the same environment, which may relate to the same communication beams with a base station, position information, etc. Sharing such information may enable additional functionality at UEs that are unable to determine the information on their own, or may enable UEs to improve accuracy of their own measurements (e.g., based on information from neighbor UEs). The present disclosure provides systems, apparatus, methods, and computer-readable media for sharing information between neighboring UEs (e.g., UEs in a similar environment). The information may be shared by a base station or may be shared between UEs using sidelink connections.

In some implementations, a first UE may transmit an information request to a base station, and the base station may determine neighboring UEs to the first UE and retrieve the corresponding information from the neighboring UEs for providing to the first UE. The base station may determine the neighboring UEs based on information inferred at the base station (e.g., beam locations, UE trajectories, etc.), information retrieved from another network component (e.g., position information from a location management function (LMF) or other component), or position information retrieved from or reported by serving UEs. In some other implementations, the base station may determine the neighboring UEs of the first UE and send a list of the neighboring UEs to the first UE, such that the first UE may form sidelink connections with the neighboring UEs and retrieve the corresponding information. In some other implementations, the first UE may form sidelink connections with neighboring UEs without assistance from a base station, and the first UE may retrieve the corresponding information from the neighboring UEs via the sidelink connections. The first UE may use the information to perform one or more operations, such as estimating a position of the first UE, estimating a speed of the first UE, selecting one or more candidate beams of a base station, selecting a candidate channel for communication with a base station, other operations, or a combination thereof, as non-limiting examples. Thus, sharing the information via sidelink communications between the UEs enables enhanced functionality of the UEs, which may improve user experience associated with the UEs.

Figure 3:
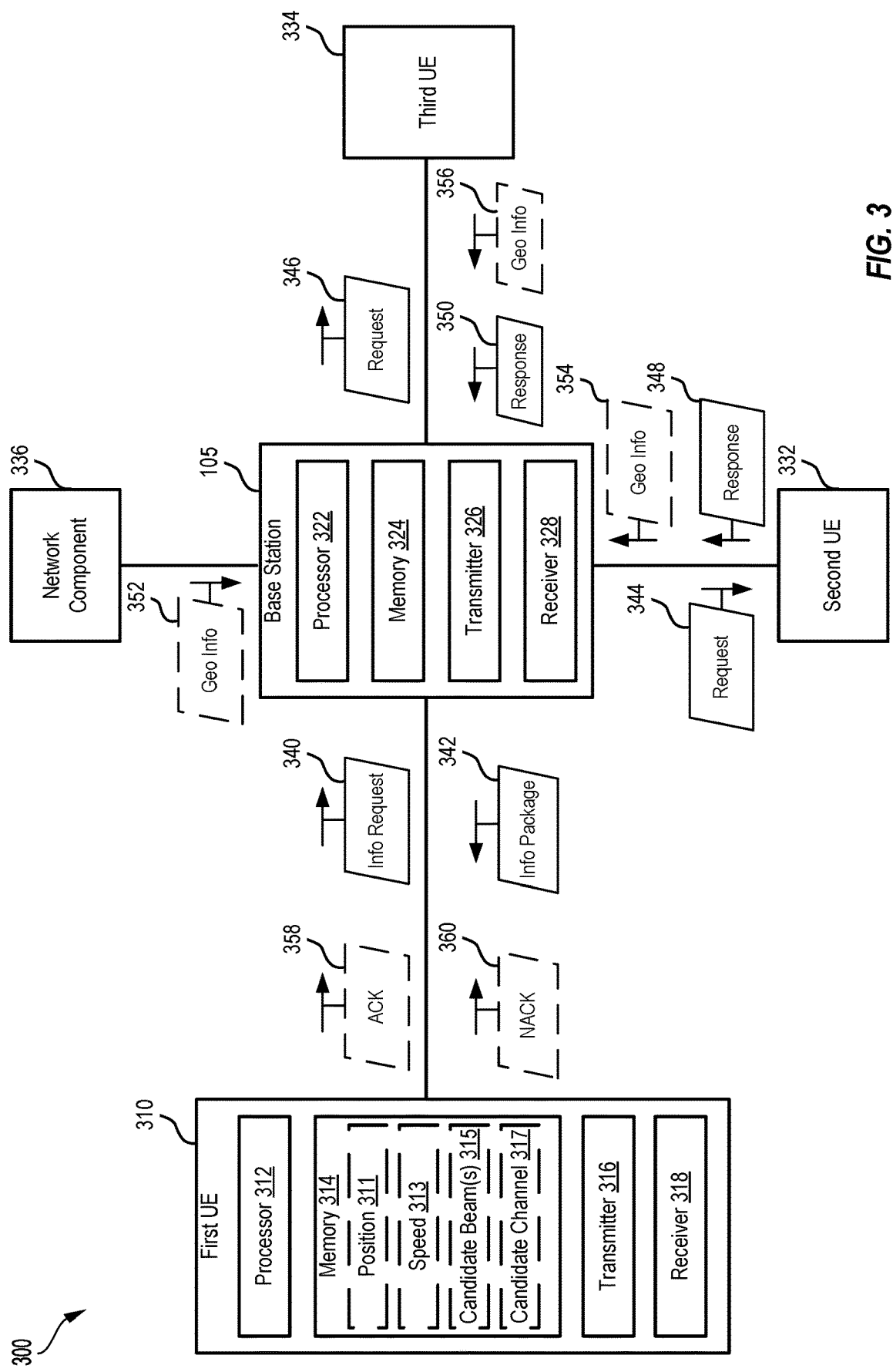
FIG. 3 is a block diagram illustrating an example wireless communication system that supports base station-assisted retrieval of information to a UE according to one or more aspects.

FIG. 3 is a block diagram of an example wireless communications system 300 that supports base station-assisted retrieval of information to a UE according to one or more aspects. In some examples, wireless communications system 300 may implement aspects of wireless network 100. Wireless communications system 300 includes first UE 310, base station 105, second UE 332, third UE 334, and network component 336. First UE 310, second UE 332, or third UE 334 may include or correspond to UE 115. Although three UEs and one base station are illustrated, in other implementations, wireless communications system 300 may include more than three UEs or fewer than three UEs, more than one base station, or both.

First UE 310 can include a variety of components (e.g., structural, hardware components) used for carrying out one or more functions described herein. For example, these components can include a processor 312, a memory 314, a transmitter 316, and a receiver 318. Processor 312 may be configured to execute instructions stored at memory 314 to perform the operations described herein. In some implementations, processor 312 includes or corresponds to controller 280, and memory 314 includes or corresponds to memory 282.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, first UE 310 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver 318, or both may include or correspond to one or more components of UE 115 described with reference to FIG. 2.

Base station 105 can include a variety of components (e.g., structural, hardware components) used for carrying out one or more functions described herein. For example, these components can include processor 322, memory 324, transmitter 326, and receiver 328. Processor 322 may be configured to execute instructions stored at memory 324 to perform the operations described herein. In some implementations, processor 322 includes or corresponds to controller 240, and memory 324 includes or corresponds to memory 242.

Transmitter 326 is configured to transmit data to one or more other devices, and receiver 328 is configured to receive data from one or more other devices. For example, transmitter 326 may transmit data, and receiver 328 may receive data, via a network, such as a wired network, a wireless network, or a combination thereof. For example, base station 105 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 326 and receiver 328 may be replaced with a transceiver. Additionally, or alternatively, transmitter 326, receiver, 328, or both may include or correspond to one or more components of base station 105 described with reference to FIG. 2.

Second UE 332, third UE 334, and network component 336 may also include one or more components, such as processors, memories, transmitters, receivers, etc., which are not shown for convenience. Second UE 332, third UE 334, and network component 336 may be configured to communicate with other devices of wireless communications system 300.

In some implementations, wireless communications system 300 implements a 5G NR network. For example, wireless communications systems 300 may include multiple 5G-capable UEs, such as first UE 310, second UE 332, and third UE 334, and multiple 5G-capable base stations 105 (or other components) configured to operate in accordance with a 5G NR network protocol such as that defined by the 3GPP.

During operation of wireless communications system 300, first UE 310 may generate and transmit an information request 340 to base station 105. Information request 340 corresponds to neighbor UEs of first UE 310 (e.g., is a request for information from neighbor UEs). Information request 340 indicates the type of information requested, the capability to use the information at first UE 310, or a combination thereof. For example, the information requested may include beam selection data, angle of arrival (AoA) data, angle of departure (AoD) data, zenith angle of arrival (ZoA) data, zenith angle of departure (ZoD) data, position data, velocity data, channel information, quasi co-location (QCL) data, Doppler spread data, Doppler shift data, delay profile data, delay spread data, other information useful to first UE 310, or a combination thereof. The capability may include a machine learning (ML) or artificial intelligence (AI) algorithm or system, such as a position estimator, a beam selector, or other ML or AI algorithm, as further described herein, that is supported by first UE 310. The information request 340 may be communicated via a physical uplink control channel (PUCCH) or a medium access control (MAC) control element (MAC CE). In some implementations, information request 340 includes or corresponds to one or more radio resource control (RRC) messages. In some other implementations, information request 340 includes or corresponds to one or more uplink control information (UCI) messages. In some other implementations, information request 340 includes or corresponds to one or more MAC CEs.

Base station 105 receives information request 340 from first UE 310 and selects (e.g., identifies) a subset of UEs of one or more serving UEs as neighbor UEs of first UE 310. The subset of UEs may be selected based on geographic information. The geographic information indicates locations of the one or more serving UEs of base station 105. In some implementations, base station 105 infers (e.g., determines) the geographic information based on information generated or stored at base station 105. For example, base station 105 may infer the geographic information based on communication beams corresponding to the one or more serving UEs and first UE 310, trajectories of the one or more UEs and first UE 310, other information determined by base station 105, or a combination thereof. To illustrate, base station 105 may determine locations of the one or more serving UEs and first UE 310 based on communication beams (e.g., transmit and receive beams) used to communicate with the one or more serving UEs and first UE 310. As another example, base station 105 may be configured to monitor trajectories of the one or more serving UEs and first UE 310, and based on the trajectories, base station 105 may determine locations of the one or more serving UEs and first UE 310.

In some other implementations, base station 105 may request the geographic information from network component 336. For example, base station 105 may be communicatively coupled to a core network including network component 336. Network component 336 may be configured to generate and maintain geographic information 352 for UEs within wireless communications system 300. For example, network component 336 may include or correspond to a location management function (LMF). As another example, network component 336 may include or correspond to a position server. Network component 336 may provide geographic information 352 to base station 105 in response to the request.

In some other implementations, base station 105 may request the geographic information from the one or more serving UEs. For example, base station 105 may serve first UE 310, second UE 332, and third UE 334. Base station 105 may request corresponding geographic information from second UE 332 and third UE 334. Second UE 332 may transmit geographic information 354 to base station 105, and third UE 334 may transmit geographic information 356 to base station 105. Alternatively, geographic information 354 and geographic information 356 may be self-reported to base station 105 by the corresponding UE (e.g., without being requested).

In some other implementations, base station 105 may use a combination of the above-described three techniques to determine the geographic information. For example, base station 105 may determine the geographic information based on one or more of information inferred (e.g., determined) at base station 105, geographic information 352 received from network component 336, and geographic information 354 and geographic information 356 received from second UE 332 and third UE 334, respectively.

After determining the geographic information, base station 105 may select (e.g., identify) a subset of the one or more serving UEs that are neighbor UEs of first UE 310. For example, base station 105 may identify which UEs of the one or more serving UEs are located within a particular range of first UE 310. In the implementation illustrated in FIG. 3, base station 105 determines that second UE 332 is a neighbor UE of first UE 310 and that third UE 334 is not a neighbor UE of first UE 310 based on the geographic information.

In addition to determining the neighbor UE(s) of first UE 310, base station 105 retrieves information from UEs based on receiving information request 340. Base station 105 may transmit, to the one or more serving UEs, one or more requests for the information. For example, base station 105 may transmit request 344 to second UE 332 and may transmit request 346 to third UE 334. Request 344 and request 346 may indicate the type of information requested by information request 340 (e.g., the type of information to be used at first UE 310). Responsive to receipt of request 344, second UE 332 transmits response 348 to base station 105, and, responsive to receipt of request 346, third UE 334 transmits response 350 to base station 105. Response 348 and response 350 include the information corresponding to second UE 332 and third UE 334, respectively. The information may include beam selection data, AoA data, AoD data, ZoA data, ZoD data, position data, velocity data, channel information, QCL data, Doppler spread data, Doppler shift data, delay profile data, delay spread data, other information useful to first UE 310, or a combination thereof.

Base station 105 receives, from the one or more serving UEs, one or more responses (e.g., response 348 and response 350) including the information. In some implementations, the one or more responses (e.g., response 348 and response 350) are received via a physical uplink shared channel (PUSCH), a PUCCH, or a combination thereof. The one or more responses (e.g., response 348 and response 350) may include or correspond to one or more radio resource control (RRC) messages, one or more uplink control information (UCI) messages, or one or more medium access control (MAC) control elements (MAC CEs).

Base station 105 may select information corresponding to a subset of UEs of the one or more serving UEs for generating information package 342. Information package 342 includes information corresponding to the subset of UEs (e.g., at least one of the one or more serving UEs). For example, information package 342 includes information corresponding to the neighbor UEs of first UE 310. To illustrate, in the example of FIG. 3, information package 342 includes the information included in response 348 (e.g., because second UE 332 is a neighbor UE of first UE 310) and not the information included in response 350 (e.g., because third UE 334 is not a neighbor UE of first UE 310) In some implementations, base station 105 requests information from all serving UEs and filters the information that is included in information package 342. In some other implementations, base station 105 only requests information for UEs that are neighbor UEs of first UE 310 (and includes all the received information in information package 342).

Base station 105 transmits information package 342 to first UE 310. In some implementations, information package 342 is transmitted via a physical downlink shared channel (PDSCH), a physical downlink control channel (PDCCH), or both. In some implementations, information package 342 includes or corresponds to one or more RRC messages. In some other implementations, information package 342 includes or corresponds to one or more downlink control information (DCI) messages.

In some implementations, if information package 342 is successfully received by first UE 310, first UE 310 generates and transmits an acknowledgement (ACK) 358 to base station 105. ACK 358 indicates successful receipt of information package 342. Base station 105 receives ACK 358 and completes the response process to receiving information request 340. Alternatively, if information package 342 is not successfully received by first UE 310, first UE 310 generates and transmits a negative-acknowledgement (NACK) 360 to base station 105. NACK 360 indicates unsuccessful receipt of information package 342 (e.g., information package 342 was not received or was received but was corrupted). Based on receiving NACK 360, base station 105 reschedules transmission of information package 342 to first UE 310. At the rescheduled time, first UE 310 receives a retransmission of information package 342. Thus, errors in receipt of information package 342 may be compensated for by base station 105.

After receiving information package 342, first UE 310 uses the information included within information package 342 (e.g., the information retrieved from neighbor UEs of first UE 310) to perform one or more operations. For example, first UE 310 may include ML or AI algorithms capable of using information from neighboring UEs to perform one or more operations at first UE 310, such as k-nearest neighbors algorithms, distance-based or geometric-based regression algorithms, DL based algorithms, or other algorithms, as non-limiting examples. As an example, first UE 310 may estimate position 311 of first UE 310 based on the information included in information package 342. To illustrate, information package 342 may include position information for second UE 332 and distance information indicating a distance or a direction of second UE 332 from first UE 310, and first UE 310 may estimate position 311 based on this information. As another example, first UE 310 may estimate speed 313 of first UE 310 based on information included in information package 342. To illustrate, information package 342 may include position information for second UE 332, speed information for second UE 332, and distance information indicating a distance or a direction of second UE 332 from first UE 310, and first UE 310 may estimate speed 313 based on this information. As another example, first UE 310 may predict one or more candidate beams 315 of base station 105 based on the information included in information package 342. To illustrate, information package 342 may include position information of second UE 332, one or more communication beams used by second UE 332 and base station 105, and distance information indicating a distance or direction from first UE 310 to second UE 332, and first UE 310 may predict one or more candidate beams 315 based on this information. As another example, first UE 310 may predict a candidate channel 317 for communicating with base station 105 based on information included in information package 342. To illustrate, information package 342 may include position information of second UE 332, one or more channels used for communication by second UE 332 and base station 105, and distance information indicating a distance or direction from first UE 310 to second UE 332, and first UE 310 may predict candidate channel 317 based on this information. These examples are for illustration only, and in other implementations, other operations may be performed by first UE 310 based on the information included in information package 342.

As described with reference to FIG. 3, the present disclosure provides techniques for enabling base station 105 to assist first UE 310 in obtaining information from neighbor UEs. For example, first UE 310 transmits information request 340 to base station 105, and base station 105 transmits information package 342 to first UE 310. Information package 342 includes information from neighbor UEs of first UE 310. First UE 310 may use the information included in information package 342 to perform one or more operations, such as position estimation, speed estimation, beam selection, channel selection, etc., which provides enhanced functionality at first UE 310 and improves a user experience associated with first UE 310.

Figure 4:
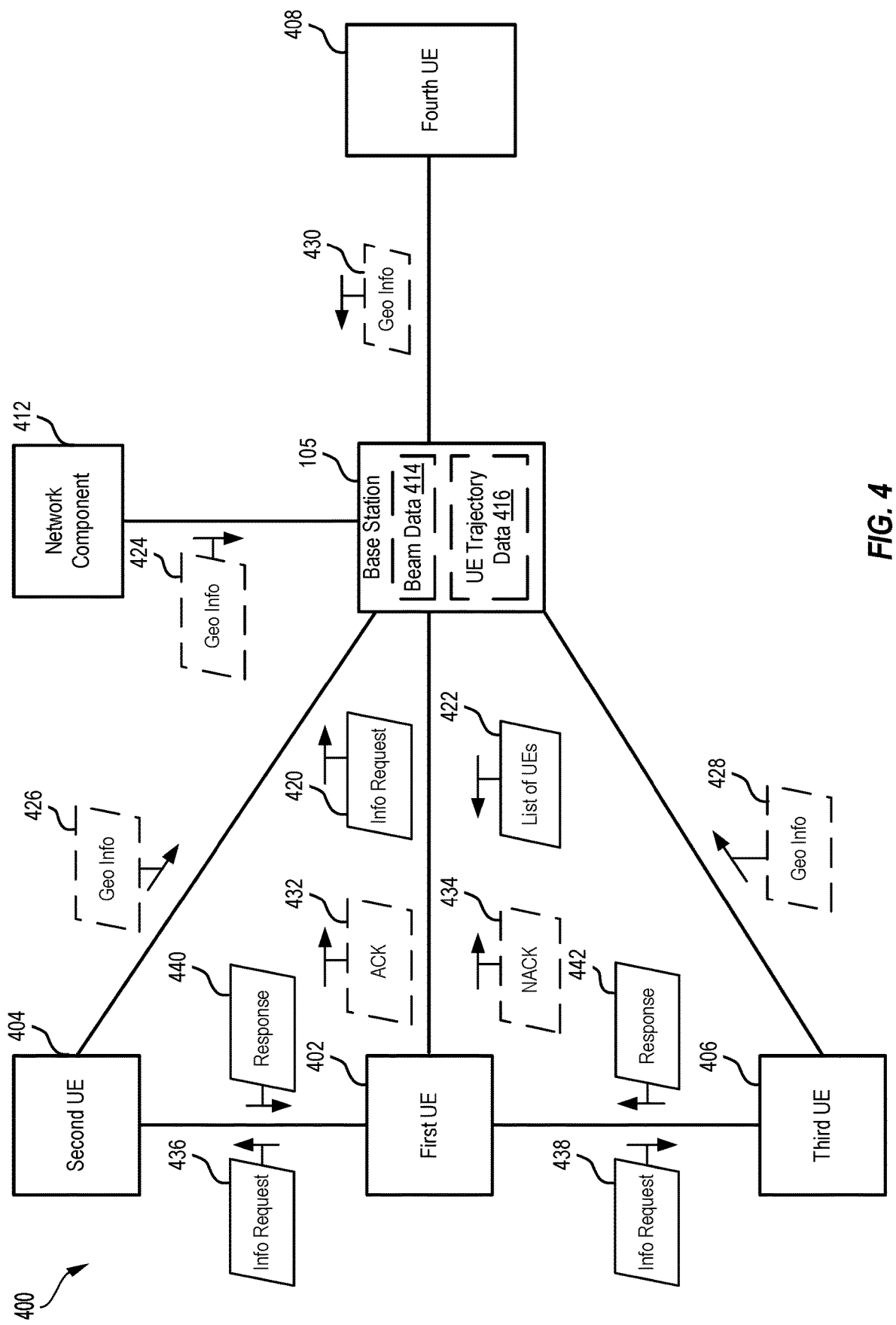
FIG. 4 is a block diagram illustrating an example wireless communication system that supports base station-assisted and sidelink-assisted retrieval of information to a UE according to one or more aspects.

FIG. 4 is a block diagram illustrating an example wireless communications system 400 that supports base station-assisted and sidelink-assisted retrieval of information to a UE according to one or more aspects. Wireless communications system 400 includes first UE 402, second UE 404, third UE 406, fourth UE 408, base station 105, and network component 412. First UE 402, second UE 404, third UE 406, fourth UE 408, base station 105, and network component 412 may include components similar to those described in FIG. 3, such as processors, memories, transmitters, and receivers, which are not shown for convenience. Although four UEs and one base station are illustrated, in other implementations, wireless communications system 400 may include fewer than four or more than four UEs, more than one base station, or both.

During operation of wireless communications system 400, first UE 402 may generate and transmit an information request 420 to base station 105. Information request 420 corresponds to neighbor UEs of first UE 402 (e.g., is a request for information from neighbor UEs). Information request 420 indicates the type of information requested, the capability to use the information at first UE 402, or a combination thereof. For example, the information requested may include beam selection data, AoA data, AoD data, ZoA data, ZoD data, position data, velocity data, channel information, QCL data, Doppler spread data, Doppler shift data, delay profile data, delay spread data, other information useful to first UE 402, or a combination thereof. The capability may include a ML or AI algorithm or system, such as a position estimator, a beam selector, or other ML or AI algorithm, as further described herein. Information request 420 may be communicated via a PUCCH or a MAC CE. In some implementations, information request 420 includes or corresponds to one or more RRC messages. In some other implementations, information request 420 includes or corresponds to one or more UCI messages. In some other implementations, information request 420 includes or corresponds to one or more MAC CEs.

Base station 105 receives information request 420 from first UE 402 and determines (e.g., identifies) a subset of UEs of one or more serving UEs as neighbor UEs of first UE 402. The subset of UEs may be determined based on geographic information. The geographic information indicates locations of the one or more serving UEs of base station 105. In some implementations, base station 105 infers (e.g., determines) the geographic information based on information generated or stored at base station 105. For example, base station 105 may infer the geographic information based on beam data 414 indicating communication beams corresponding to the one or more serving UEs and first UE 402, UE trajectory data 416 indicating trajectories of the one or more UEs and first UE 402, other information determined (e.g., inferred) by base station 105, or a combination thereof. To illustrate, base station 105 may determine (e.g., infer) locations of the one or more serving UEs and first UE 402 based on communication beams (e.g., transmit and receive beams) used to communicate with the one or more serving UEs and first UE 402. As another example, base station 105 may be configured to monitor trajectories of the one or more serving UEs and first UE 402, and based on the trajectories, base station 105 may determine locations of the one or more serving UEs and first UE 402.

In some other implementations, base station 105 may request the geographic information from network component 412. For example, base station 105 may be communicatively coupled to a core network including network component 412. Network component 412 may be configured to generate and maintain geographic information 424 for UEs within wireless communications system 400. For example, network component 412 may include or correspond to a LMF. As another example, network component 412 may include or correspond to a position server. Network component 412 may provide geographic information 424 to base station 105 in response to the request.

In some other implementations, base station 105 may request the geographic information from the one or more serving UEs. For example, base station 105 may serve first UE 402, second UE 404, third UE 406, and fourth UE 408. Base station 105 may request corresponding geographic information from second UE 404, third UE 406, and fourth UE 408. Second UE 404 may transmit geographic information 426 to base station 105, third UE 406 may transmit geographic information 428 to base station 105, and fourth UE 408 may transmit geographic information 430 to base station 105. Alternatively, geographic information 426, geographic information 428, and geographic information 430 may be self-reported to base station 105 by the corresponding UE (e.g., without being requested).

In some other implementations, base station 105 may use a combination of the above-described three techniques to determine the geographic information. For example, base station 105 may determine the geographic information based on one or more of information inferred (e.g., determined) at base station 105, geographic information 424 received from network component 412, and geographic information 426, geographic information 428, and geographic information 430 received from second UE 404, third UE 406, and fourth UE 408, respectively.

After determining the geographic information, base station 105 may determine (e.g., identify) a subset of the one or more serving UEs that are neighbor UEs of first UE 402. For example, base station 105 may identify which UEs of the one or more serving UEs are located within a particular range of first UE 402. In the implementation illustrated in FIG. 4, base station 105 determines that second UE 404 and third UE 406 are neighbor UEs of first UE 402 and that fourth UE 408 is not a neighbor UE of first UE 402 based on the geographic information.

After determining the subset of UEs (e.g., the neighbor UEs of first UE 402), base station 105 generates and transmits a list of neighbor UEs 422 to first UE 402 to enable sidelink communications between the first UE and one or more neighbor UEs. For example, list of neighbor UEs 422 may indicate the one or more neighbor UEs of first UE 402 as determined by base station 105. List of neighbor UEs 422 may indicate the neighbor UEs by identifiers, such as MAC addresses, internet protocol (IP) addresses, device identifiers, or other identifiers that identify the one or more neighbor UEs (e.g., second UE 404 and third UE 406 in the example of FIG. 4). In some implementations, list of neighbor UEs 422 is transmitted via a PDSCH, a PDCCH, or both. In some implementations, list of neighbor UEs 422 includes or corresponds to one or more RRC messages. In some other implementations, list of neighbor UEs 422 includes or corresponds to one or more DCI messages.

In some implementations, if list of neighbor UEs 422 is successfully received by first UE 402, first UE 402 generates and transmits an ACK 432 to base station 105. ACK 432 indicates successful receipt of list of neighbor UEs 422. Base station 105 receives ACK 432 and completes the response process to receiving information request 420. Alternatively, if list of neighbor UEs 422 is not successfully received by first UE 402, first UE 402 generates and transmits a NACK 434 to base station 105. NACK 434 indicates unsuccessful receipt of list of neighbor UEs 422 (e.g., list of neighbor UEs 422 was not received or was received but was corrupted). Based on receiving NACK 434, base station 105 reschedules transmission of list of neighbor UEs 422 to first UE 402. At the rescheduled time, first UE 402 receives a retransmission of list of neighbor UEs 422.

Thus, errors in receipt of list of neighbor UEs 422 may be compensated for by base station 105.

After receiving list of neighbor UEs 422, first UE 402 establishes one or more sidelink connections with the one or more neighbor UEs. Sidelink connections are connections that enable direct communication between two UEs without going through a base station. As an example, two vehicles may establish communications between each other without assistance by a base station. Sidelink communication protocols may be specified in a wireless communication standard, such as a 3GPP standard, as a non-limiting example. In the example illustrated in FIG. 4, first UE 402 may establish a sidelink connection with second UE 404, and first UE 402 may establish a sidelink connection with third UE 406, because second UE 404 and third UE 406 are identified as neighbor UEs in list of neighbor UEs 422. First UE 402 does not establish a sidelink connection with fourth UE 408 because fourth UE 408 is not indicated as a neighbor UE of first UE 402 in list of neighbor UEs 422.

After establishing the one or more sidelink connections with the one or more neighbor UEs, first UE 402 may transmit, to the one or more neighbor UEs via the one or more sidelink connections, one or more information requests. For example, first UE 402 may transmit information request 436 to second UE 404 and may transmit information request 438 to third UE 406. The one or more information requests (e.g., information request 436 and information request 438) may be transmitted via a physical sidelink control channel (PSCCH). In some implementations, the one or more information requests may include or correspond to one or more RRC messages, one or more UCI messages, or one or more MAC CEs (or one or more information elements contained within the corresponding message). In some implementations, the information elements may be specified by a wireless communication standard, such as a 3GPP standard, as a non-limiting example.

First UE 402 may receive information corresponding to the one or more information requests from the one or more neighbor UEs via the one or more sidelink connections. For example, first UE 402 may receive response 440 from second UE 404 and may receive response 442 from third UE 406. The one or more responses (e.g., response 440 and response 442) include information corresponding to the one or more information requests (e.g., information request 436 and information request 438). In some implementations, the information includes beam selection data, AoA data, AoD data, ZoA data, ZoD data, position data, velocity data, channel information, QCL data, Doppler spread data, Doppler shift data, delay profile data, delay spread data, other information useful to first UE 402, or a combination thereof. The information may be received at first UE 402 via a PSCCH, via a physical sidelink shared channel (PSSCH), or both. The one or more responses may include or correspond to one or more RRC messages, one or more DCI messages, or one or more MAC CEs (or to specific information elements included in the corresponding message(s)). In some implementations, the information elements may be specified by a wireless communication standard, such as a 3GPP standard, as a non-limiting example.

After receiving the information (e.g., response 440 and response 442), first UE 402 uses the information included within the responses (e.g., the information retrieved from neighbor UEs of first UE 402) to perform one or more operations. For example, first UE 402 may include ML or AI algorithms capable of using information from neighboring UEs to perform one or more operations at first UE 402, such as k-nearest neighbors algorithms, distance-based or geo-metric-based regression algorithms, DL based algorithms, or other algorithms, as non-limiting examples. As an example, first UE 402 may estimate a position of first UE 402 based on the information received from the neighbor UEs. To illustrate, response 440 or response 442 may include position information for second UE 404 and third UE 406 and distance information indicating a distance or a direction of second UE 404 and third UE 406 from first UE 402, and first UE 402 may estimate the position based on this information. As another example, first UE 402 may estimate a speed of first UE 402 based on information received from the neighbor UEs. To illustrate, response 440 or response 442 may include position information for second UE 404 and third UE 406, speed information for second UE 404 and third UE 406, and distance information indicating a distance or a direction of second UE 404 and third UE 406 from first UE 402, and first UE 402 may estimate the speed based on this information. As another example, first UE 402 may predict one or more candidate beams of base station 105 based on the information received from the neighbor UEs. To illustrate, response 440 or response 442 may include position information of second UE 404 and third UE 406, one or more communication beams used by second UE 404, third UE 406, and base station 105, and distance information indicating a distance or direction from first UE 402 to second UE 404 and third UE 406, and first UE 402 may predict one or more candidate beams based on this information. As another example, first UE 402 may predict a candidate channel for communicating with base station 105 based on information received from the neighbor UEs. To illustrate, response 440 or response 442 may include position information of second UE 404 and third UE 406, one or more channels used for communication by second UE 404, third UE 406, and base station 105, and distance information indicating a distance or direction from first UE 402 to second UE 404 and third UE 406, and first UE 402 may predict a candidate channel based on this information. These examples are for illustration only, and in other implementations, other operations may be performed by first UE 402 based on the information received from the neighbor UEs.

As described with reference to FIG. 4, the present disclosure provides techniques that enable sharing of information between UEs using sidelink communications that are assisted by a base station. As described with reference to FIG. 3, sharing the information may enable enhanced functionality at a UE (e.g., first UE 402), which improves a user experience associated with the UE. Additionally, offloading the communication of the information to sidelink connections may reduce congestion on wireless channels used by base station 105 to communicate with serving UEs.

FIG. 5 is a block diagram illustrating an example wireless communications system 500 that supports sidelink-assisted retrieval of information to a UE according to one or more aspects. Wireless communications system 500 includes first UE 502, second UE 504, third UE 507, fourth UE 508, and base station 105. First UE 502, second UE 504, third UE 506, fourth UE 508, and base station 105 may include components similar to described in FIG. 3, such as processors, memories, transmitters, and receivers, which are not shown for convenience, Although four UEs and one base station are illustrated, in other implementations, wireless communications system 500 may include fewer than four or more than four UEs, more than one base station, or both.

During operation of wireless communications system 500, first UE 502 establishes sidelink connections with one or more neighbor UEs without assistance from base station 105. For example, first UE 502 may identify neighbor UEs on its own (e.g., without assistance from base station 105) and may establish sidelink connections with the neighbor UEs. In the example illustrated in FIG. 5, second UE 504 and third UE 506 are neighbor UEs of first UE 502, and fourth UE 508 is not a neighbor UE of first UE 502. Accordingly, first UE 502 establishes a sidelink connection with second UE 504 and with third UE 506, and first UE 502 does not establish a sidelink connection with fourth UE 508.

After establishing the one or more sidelink connections with the one or more neighbor UEs, first UE 502 may transmit, to the one or more neighbor UEs via the one or more sidelink connections, one or more information requests. For example, first UE 502 may transmit information request 510 to second UE 504 and may transmit information request 512 to third UE 506. The one or more information requests (e.g., information request 510 and information request 512) may be transmitted via a PSCCH. In some implementations, the one or more information requests may include or correspond to one or more RRC messages, one or more UCI messages, or one or more MAC CEs (or one or more information elements contained within the corresponding message). In some implementations, the information elements may be specified by a wireless communication standard, such as a 3GPP standard, as a non-limiting example.

First UE 502 may receive information corresponding to the one or more information requests from the one or more neighbor UEs via the one or more sidelink connections. For example, first UE 502 may receive response 514 from second UE 504 and may receive response 516 from third UE 506. The one or more responses (e.g., response 514 and response 516) include information corresponding to the one or more information requests (e.g., information request 510 and information request 512). In some implementations, the information includes beam selection data, AoA data, AoD data, ZoA data, ZoD data, position data, velocity data, channel information, QCL data, Doppler spread data, Doppler shift data, delay profile data, delay spread data, other information useful to first UE 502, or a combination thereof. The information may be received at first UE 502 via a PSCCH, via a PSSCH, or both. The one or more responses may include or correspond to one or more RRC messages, one or more DCI messages, or one or more MAC CEs (or to specific information elements included in the corresponding message(s)). In some implementations, the information elements may be specified by a wireless communication standard, such as a 3GPP standard, as a non-limiting example.

After receiving the information (e.g., response 514 and response 516), first UE 502 uses the information included within the responses (e.g., the information retrieved from neighbor UEs of first UE 502) to perform one or more operations. For example, first UE 502 may include ML or AI algorithms capable of using information from neighboring UEs to perform one or more operations at first UE 502, such as k-nearest neighbors algorithms, distance-based or geometric-based regression algorithms, DL based algorithms, or other algorithms, as non-limiting examples. As an example, first UE 502 may estimate a position of first UE 502 based on the information received from the neighbor UEs. To illustrate, response 514 or response 516 may include position information for second UE 504 and third UE 506 and distance information indicating a distance or a direction of second UE 504 and third UE 506 from first UE 502, and first UE 502 may estimate the position based on this information. As another example, first UE 502 may estimate a speed of first UE 502 based on information received from the neighbor UEs. To illustrate, response 514 or response 516 may include position information for second UE 504 and third UE 506, speed information for second UE 504 and third UE 506, and distance information indicating a distance or a direction of second UE 504 and third UE 506 from first UE 502, and first UE 502 may estimate the speed based on this information. As another example, first UE 502 may predict one or more candidate beams of base station 105 based on the information received from the neighbor UEs. To illustrate, response 514 or response 516 may include position information of second UE 504 and third UE 506, one or more communication beams used by second UE 504, third UE 506, and base station 105, and distance information indicating a distance or direction from first UE 502 to second UE 504 and third UE 506, and first UE 502 may predict one or more candidate beams based on this information. As another example, first UE 502 may predict a candidate channel for communicating with base station 105 based on information received from the neighbor UEs. To illustrate, response 514 or response 516 may include position information of second UE 504 and third UE 506, one or more channels used for communication by second UE 504, third UE 506, and base station 105, and distance information indicating a distance or direction from first UE 502 to second UE 504 and third UE 506, and first UE 502 may predict a candidate channel based on this information. These examples are for illustration only, and in other implementations, other operations may be performed by first UE 502 based on the information received from the neighbor UEs.

As described with reference to FIG. 5, the present disclosure describes techniques that enable sharing of information between UEs using sidelink communications. As described with reference to FIG. 3, sharing the information may enable enhanced functionality at a UE (e.g., first UE 502), which improves a user experience associated with the UE. Additionally, offloading the communication of the information to sidelink connections may reduce congestion on wireless channels used by base station 105 to communicate with serving UEs.

Figures 6, 7:
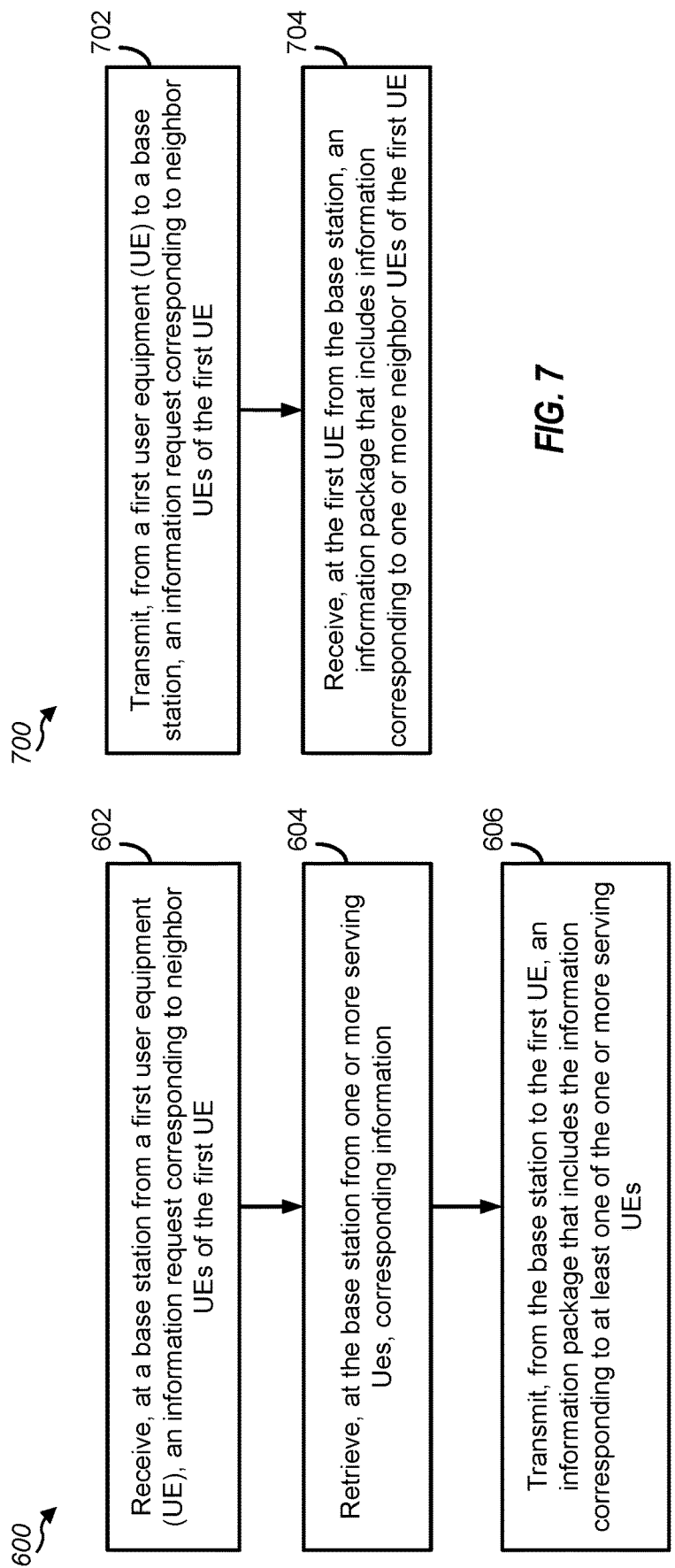
FIG. 6 is a flow diagram of an example of a method of providing information from neighboring UEs to a UE according to one or more aspects.
FIG. 7 is a flow diagram of an example of a method of receiving information corresponding to neighboring UEs from a base station according to one or more aspects.
Figure 12:
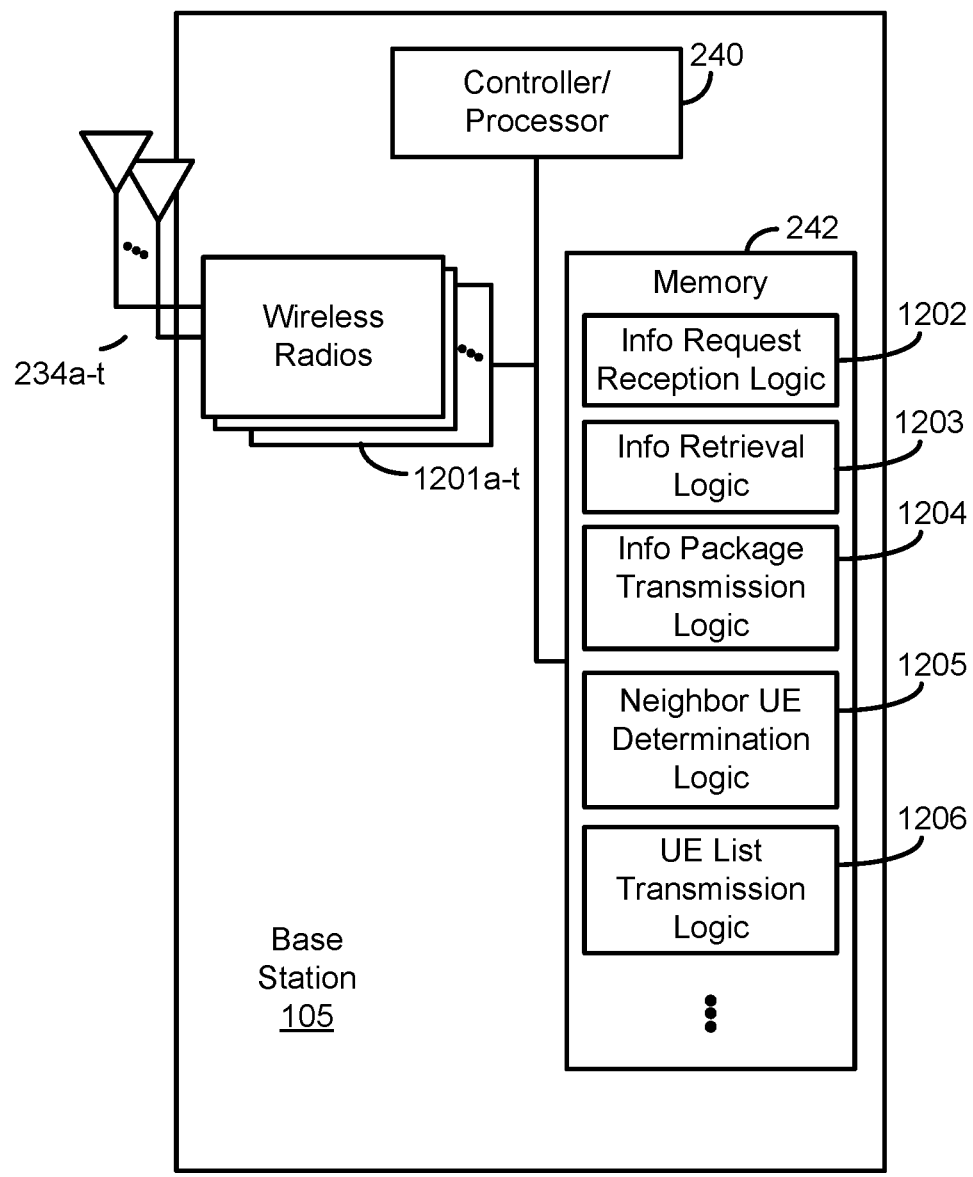
FIG. 12 is a block diagram illustrating an example base station configured according to one or more aspects.

FIG. 6 is a flow diagram illustrating an example method 600 of providing information from neighboring UEs to a UE according to one or more aspects. The method 600 will also be described with respect to base station 105 as illustrated in FIG. 12. FIG. 12 is a block diagram illustrating base station 105 configured according to one or more aspects. Base station 105 includes the structure, hardware, and components as illustrated for base station 105 of FIG. 2. For example, base station 105 includes controller 240, which operates to execute logic or computer instructions stored in memory 242, as well as controlling the components of base station 105 that provide the features and functionality of base station 105. Base station 105, under control of controller 240, transmits and receives signals via wireless radios 1201a-t and antennas 234a-t. Wireless radios 1201a-t includes various components and hardware, as illustrated in FIG. 2 for base station 105, including modulator and demodulators 232a-t, MIMO detector 236, receive processor 238, transmit processor 220, and TX MIMO processor 230.

Returning to method 600, at block 602, the base station receives, from a first UE, an information request corresponding to neighbor UEs of the first UE. The base station 105 may execute, under control of controller 240, information request reception logic 1202 stored in memory 242. The execution environment of information request reception logic 1202 provides the functionality to receive, from a first UE, an information request corresponding to neighbor UEs of the first UE.

At block 604, the base station retrieves, from one or more serving UEs, corresponding information. The base station 105 may execute, under control of controller 240, information retrieval logic 1203 stored in memory 242. The execution environment of information retrieval logic 1203 provides the functionality to retrieve, from one or more serving UEs, information requested by the information request. Retrieving the information may include transmitting one or more information requests and receiving one or more responses including the information.

At block 606, the base station transmits, to the first UE, an information package that includes the information corresponding to at least one of the one or more serving UEs. The base station 105 may execute, under control of controller 240, information package transmission logic 1204 stored in memory 242. The execution environment of information package transmission logic 1204 provides the functionality to transmit, to the first UE, an information package that includes information corresponding to at least one of the one or more serving UEs. The at least one of the one or more serving UEs are neighbor UEs of the first UE.

Figure 11:
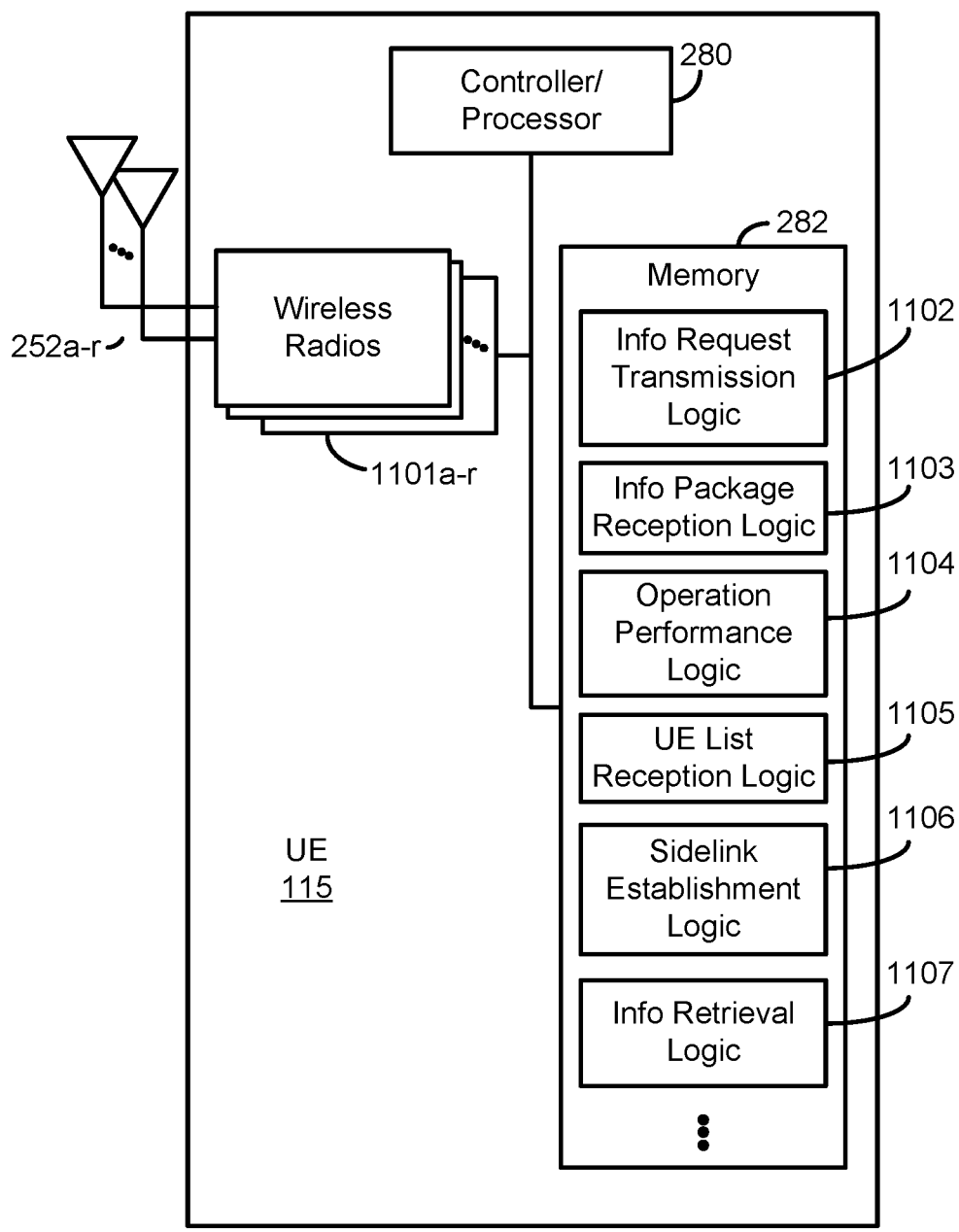
FIG. 11 is a block diagram illustrating an example UE configured according to one or more aspects.

FIG. 7 is a flow diagram of an example of a method 700 of receiving information corresponding to neighboring UEs from a base station according to one or more aspects. Method 700 will also be described with respect to UE 115 as illustrated in FIG. 11. FIG. 11 is a block diagram illustrating UE 115 configured according to one or more aspects. UE 115 includes the structure, hardware, and components as illustrated for UE 115 of FIG. 2. For example, UE 115 includes controller 280, which operates to execute logic or computer instructions stored in memory 282, as well as controlling the components of UE 115 that provide the features and functionality of UE 115. UE 115, under control of controller 280, transmits and receives signals via wireless radios 1101*a-r* and antennas 252*a-r*. Wireless radios 1101*a-r* includes various components and hardware, as illustrated in FIG. 2 for UE 115, including modulator and demodulators 254*a-r*, MIMO detector 256, receive processor 258, transmit processor 264, and TX MIMO processor 266.

Returning to method 700, at block 702, the UE transmits, to a base station, an information request corresponding to neighbor UEs of the first UE. The UE 115 may execute, under control of controller 280, information request transmission logic 1102 stored in memory 282. The execution environment of information request transmission logic 1102 provides the functionality to transmit, to a base station, an information request corresponding to neighbor UEs of UE 115.

At block 704, the UE receives, from the base station, an information package that includes information corresponding to one or more neighbor UEs of the first UE. The UE 115 may execute, under control of controller 280, information package reception logic 1103 stored in memory 282. The execution environment of information package reception logic 1103 provides the functionality to receive, from the base station, an information package that includes information corresponding to one or more neighbor UEs of UE 115. The information may be used to perform one or more operations, such as by execution of operation performance logic 1104.

Figures 8, 9:
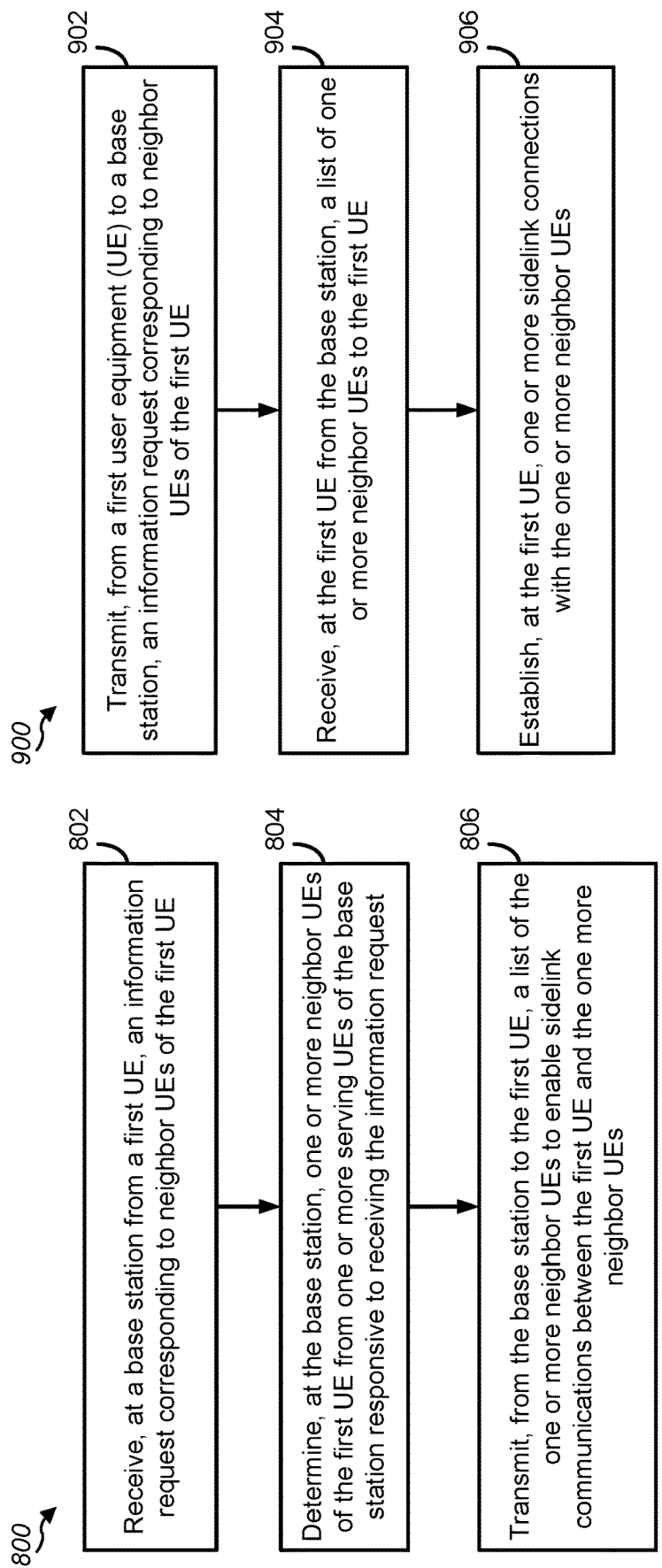
FIG. 8 is a flow diagram of an example of a method of providing a list of neighboring UEs to a UE according to one or more aspects.
FIG. 9 is a flow diagram of an example of a method of receiving a list of neighboring UEs and forming sidelink connections with the neighboring UEs according to one or more aspects.

FIG. 8 is a flow diagram of an example of a method 800 of providing a list of neighboring UEs to a UE according to one or more aspects. Method 800 will also be described with respect to base station 105 as illustrated in FIG. 12.

At block 802, the base station receives, from a first UE, an information request corresponding to neighbor UEs of the first UE. The base station 105 may execute, under control of controller 240, information request reception logic 1202 stored in memory 242. The execution environment of information request reception logic 1202 provides the functionality to receive, from a first UE, an information request corresponding to neighbor UEs of the first UE.

At block 804, the base station determines one or more neighbor UEs of the first UE from one or more serving UEs of the base station responsive to receiving the information request. The base station 105 may execute, under control of controller 240, neighbor UE determination logic 1205 stored in memory 242. The execution environment of neighbor UE determination logic 1205 provides the functionality for base station 105 to determine one or more neighbor UEs of the first UE from one or more serving UEs of base station 105 responsive to receiving the information request. The determination may be based on geographic information inferred by base station 105, geographic information retrieved from a network component (e.g., a LMF or position server), or geographic information retrieved from (or self-reported by) the serving UEs of base station 105.

At block 806, the base station transmits, to the first UE, a list of one or more neighbor UEs to enable sidelink communications between the first UE and the one or more neighbor UEs. The base station 105 may execute, under control of controller 240, UE list transmission logic 1206 stored in memory 242. The execution environment of UE list transmission logic 1206 provides the functionality to transmit, to the first UE, a list of one or more neighbor UEs to the first UE. The list of one or more neighbor UEs enables sidelink communications between the first UE and the one or more neighbor UEs.

FIG. 9 is a flow diagram of an example of a method 900 of receiving a list of neighboring UEs and forming sidelink connections with the neighboring UEs according to one or more aspects. Method 900 will also be described with respect to UE 115 as illustrated in FIG. 11.

At block 902, the UE transmits, to a base station, an information request corresponding to neighbor UEs of the first UE. The UE 115 may execute, under control of controller 280, information request transmission logic 1102 stored in memory 282. The execution environment of information request transmission logic 1102 provides the functionality to transmit, to a base station, an information request corresponding to neighbor UEs of UE 115.

At block 904, the UE receives, from the base station, a list of one or more neighbor UEs to the UE. The UE 115 may execute, under control of controller 280, UE list reception logic 1105 stored in memory 282. The execution environment of UE list reception logic 1105 provides the functionality to receive, from the base station, a list of one or more neighbor UEs to UE 115.

At block 906, the UE establishes one or more sidelink connections with the one or more neighbor UEs. The UE 115 may execute, under control of controller 280, sidelink establishment logic 1106 stored in memory 282. The execution environment of sidelink establishment logic 1106 provides the functionality to establish one or more sidelink connections with the one or more neighbor UEs of UE 115.

Figure 10:
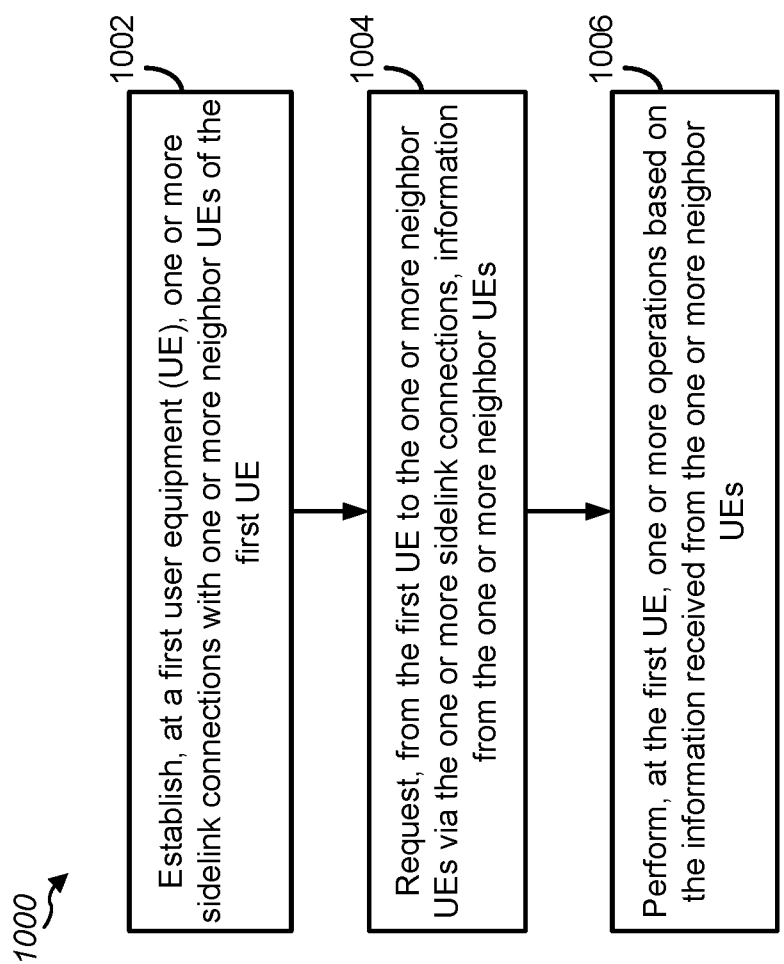
FIG. 10 is a flow diagram of an example of a method of forming sidelink connections to retrieve information from neighboring UEs according to one or more aspects.

FIG. 10 is a flow diagram of an example of a method 1000 of forming sidelink connections to retrieve information from neighboring UEs according to one or more aspects. Method 1000 will also be described with respect to UE 115 as illustrated in FIG. 11.

At block 1002, the UE establishes one or more sidelink connections with one or more neighbor UEs. The UE 115 may execute, under control of controller 280, sidelink establishment logic 1106 stored in memory 282. The execution environment of sidelink establishment logic 1106 provides the functionality to establish one or more sidelink connections with one or more neighbor UEs of UE 115. The one or more neighbor UEs are identified without assistance from a base station.

At block 1004, the UE requests, to the one or more neighbor UEs via the one or more sidelink connections, information from the one or more neighbor UEs. The UE 115 may execute, under control of controller 280, information retrieval logic 1107 stored in memory 282. The execution environment of information retrieval logic 1107 provides the functionality to request, via the one or more sidelink connections, information from the one or more neighbor UEs and to receive responses including the requested information from the one or more neighbor UEs via the one or more sidelink connections.

At block 1006, the UE performs one or more operations based on the information received from the one or more neighbor UEs. The UE 115 may execute, under control of controller 280, operation performance logic 1104 stored in memory 282. The execution environment of operation performance logic 1104 provides the functionality to perform one or more operations based on the information received from the one or more neighbor UEs. The one or more operations may include estimating a position, estimating a speed, predicting a candidate beam, predicting a candidate channel, or a combination thereof, as non-limiting examples.

It is noted that one or more blocks (or operations) described with reference to FIGS. 6-10 may be combined with one or more blocks (or operations) described with reference to another of FIGS. 6-10. For example, one or more blocks (or operations) described with reference to FIG. 6 may be combined with one or more blocks (or operations) described with reference to FIG. 7. Additionally or alternatively, one or more blocks (or operations) described with reference to FIGS. 6-10 may be combined with one or more operations associated with FIG. 1-5, 11, or 12.

In some aspects, enabling sharing of information between neighbor UEs may include additional aspects, such as any single aspect or any combination of aspects described below or in connection with one or more other processes described elsewhere herein. In some aspects, enabling sharing of information between neighbor UEs may include an apparatus configured to receive, from a first UE, an information request corresponding to neighbor UEs of the first UE. The apparatus may also be configured to retrieve, from one or more serving UEs, corresponding information. The apparatus may further be configured to initiate transmission, to the first UE, of an information package that includes the information corresponding to at least one of the one or more serving UEs. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device.

In some implementations, the apparatus may include one or more means configured to perform operations described herein.

In a first aspect, the information includes beam selection data, angle of arrival (AoA) data, angle of departure (AoD) data, zenith angle of arrival (ZoA) data, zenith angle of departure (ZoD) data, position data, velocity data, channel information, quasi co-location (QCL) data, Doppler spread data, Doppler shift data, delay profile data, delay spread data, or a combination thereof.

In a second aspect, alone or in combination with the first aspect, retrieving the corresponding information includes transmitting, from the base station to the one or more serving UEs, one or more requests for the information and receiving, at the base station from the one or more serving UEs, one or more responses including the information.

In a third aspect, alone or in combination with the second aspect, the one or more responses are received via a physical uplink shared channel (PUSCH), a physical uplink control channel (PUCCH), or a combination thereof.

In a fourth aspect, alone or in combination with the third aspect, the one or more responses include one or more radio resource control (RRC) messages, one or more uplink control information (UCI) messages, or one or more medium access control (MAC) control elements (MAC CEs).

In a fifth aspect, alone or in combination with one or more of the first through fourth aspects, the base station selects a subset of UEs of the one or more serving UEs based on geographic information.

In a sixth aspect, alone or in combination with the fifth aspect, the base station infers the geographic information based on communication beams corresponding to the one or more serving UEs and the first UE, trajectories of the one or more serving UEs and the first UE, or a combination thereof.

In a seventh aspect, alone or in combination with the fifth aspect, the base station requests the geographic information from a core network component.

In an eighth aspect, alone or in combination with the seventh aspect, the core network component includes a location management function (LMF) or a position server.

In a ninth aspect, alone or in combination with the fifth aspect, the base station requests the geographic information from the one or more serving UEs.

In a tenth aspect, alone or in combination with one of more of the first through ninth aspects, the information package is transmitted via a physical downlink shared channel (PDSCH), a physical downlink control channel (PDCCH), or both.

In an eleventh aspect, alone or in combination with the tenth aspect, the information package include one or more radio resource control (RRC) messages.

In a twelfth aspect, alone or in combination with the tenth aspect, the information package includes one or more downlink control information (DCI) messages.

In a thirteenth aspect, alone or in combination with one or more of the first through twelfth aspects, the base station receives, from the first UE, an acknowledgement (ACK) indicating successful receipt of the information package at the first UE.

In a fourteenth aspect, alone or in combination with one or more of the first through thirteenth aspects, the base station receives, from the first UE, a negative-acknowledgement (NACK) and reschedules transmission of the information package to the first UE.

In some aspects, an apparatus (e.g., a first UE) may be configured to initiate transmission, to a base station, of an information request corresponding to neighbor UEs of the first UE. The apparatus may further be configured to receive, from the base station, an information package that includes information corresponding to one or more neighbor UEs of the first UE. In some implementations, the apparatus includes a wireless device, such as a UE (e.g., the first UE). In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a fifteenth aspect, the information includes beam selection data, angle of arrival (AoA) data, angle of departure (AoD) data, zenith angle of arrival (ZoA) data, zenith angle of departure (ZoD) data, position data, velocity data, channel information, quasi co-location (QCL) data, Doppler spread data, Doppler shift data, delay profile data, delay spread data, or a combination thereof.

In a sixteenth aspect, alone or in combination with the first aspect, the information package is received via a physical downlink shared channel (PDSCH), a physical downlink control channel (PDCCH), or both.

In a seventeenth aspect, alone or in combination with the sixteenth aspect, the information package includes one or more radio resource (RRC) messages.

In an eighteenth aspect, alone or in combination with the sixteenth aspect, the information package includes one or more downlink control information (DCI) messages.

In a nineteenth aspect, alone or in combination with one or more of the fifteenth through eighteenth aspects, the first UE transmits, to the base station, an acknowledgement (ACK) indicating successful receipt of the information package.

In a twentieth aspect, alone or in combination with one or more of the fifteenth through nineteenth aspects, the first UE transmits, to the base station, a negative acknowledgement (NACK) based on failure to receive the information package and receives, from the base station, a retransmission of the information package.

In a twenty-first aspect, alone or in combination with one or more of the fifteenth through twentieth aspects, the first UE estimates a position of the first UE based on the information included in the information package.

In a twenty-second aspect, alone or in combination with one or more of the fifteenth through twenty-first aspects, the first UE estimates a speed of the first UE based on the information included in the information package.

In a twenty-third aspect, alone or in combination with one or more of the fifteenth through twenty-second aspects, the first UE predicts one or more candidate beams of the base station based on the information included in the information package.

In a twenty-fourth aspect, alone or in combination with one or more of the fifteenth through twenty-third aspects, the first UE predicts a candidate channel for communicating with the base station based on the information included in the information package.

In some aspects, an apparatus (e.g., a base station) may be configured to receive, from a first UE, an information request corresponding to neighbor UEs of the first UE. The apparatus may also be configured to determine one or more neighbor UEs of the first UE from one or more serving UEs of the base station responsive to receiving the information request. The apparatus may further be configured to initiate transmission, to the first UE, of a list of the one or more neighbor UEs to enable sidelink communications between the first UE and the one or more neighbor UEs. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a twenty-fifth aspect, the information request is received via a physical uplink control channel (PUCCH) or one or more media access control (MAC) control elements (MAC CEs).

In a twenty-sixth aspect, alone or in combination with the twenty-fifth aspect, determining the one or more neighbor UEs is based on communication beams corresponding to the one or more serving UEs and the first UE, trajectories of the one or more serving UEs and the first UE, or a combination thereof.

In a twenty-seventh aspect, alone or in combination with one or more of the twenty-fifth through twenty-sixth aspects, determining the one or more neighbor UEs includes requesting, at the base station, geographic information corresponding to the first UE and the one or more serving UEs from a core network component and determining the one or more neighbor UEs based on the geographic information.

In a twenty-eighth aspect, alone or in combination with the twenty-seventh aspect, the core network component includes a location management function (LMF) or a position server.

In a twenty-ninth aspect, alone or in combination with one or more of the twenty-fifth through twenty-eighth aspects, determining the one or more neighbor UEs includes requesting geographic information from the one or more serving UEs and determining the one or more neighbor UEs based on the geographic information.

In a thirtieth aspect, alone or in combination with one or more of the twenty-fifth through twenty-ninth aspects, the list is transmitted to the first UE via a physical downlink shared channel (PDSCH), a physical downlink control channel (PDCCH), or both.

In a thirty-first aspect, alone or in combination with the thirtieth aspect, the list is included in a particular information element of one or more radio resource control (RRC) messages.

In a thirty-second aspect, alone or in combination with the thirtieth aspect, the list is included in a particular information element of one or more downlink control information (DCI) messages.

In a thirty-third aspect, alone or in combination with one or more of the twenty-fifth through thirty-second aspects, the base station receives, from the first UE, an acknowledgement (ACK) indicating successful receipt of the list at the first UE.

In a thirty-fourth aspect, alone or in combination with one or more of the twenty-fifth through thirty-third aspects, the base station receives, from the first UE, a negative-acknowledgement (NACK) and reschedules transmission of the list to the first UE.

In some aspects, an apparatus (e.g., a first UE) may be configured to initiate transmission, to a base station, of an information request corresponding to neighbor UEs of the first UE. The apparatus may also be configured to receive, from the base station, a list of one or more neighbor UEs to the first UE. The apparatus may further be configured to establish one or more sidelink connections with the one or more neighbor UEs. In some implementations, the apparatus includes a wireless device, such as a UE (e.g., the first UE). In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a thirty-fifth aspect, the information request is transmitted via a physical uplink control channel (PUCCH).

In a thirty-sixth aspect, alone or in combination with the thirty-fifth aspect, the list is received via a physical downlink shared channel (PDSCH), a physical downlink control channel (PDCCH), or both.

In a thirty-seventh aspect, alone or in combination with one or more of the thirty-fifth through thirty-sixth aspects, the first UE transmits, to the one or more neighbor UEs via the one or more sidelink connections, one or more information requests.

In a thirty-eighth aspect, alone or in combination with a thirty-seventh aspect, the first UE receives, from the one or more neighbor UEs via the one or more sidelink connections, information corresponding to the one or more information requests.

In a thirty-ninth aspect, alone or in combination with the thirty-eighth aspect, the information includes beam selection data, angle of arrival (AoA) data, angle of departure (AoD) data, zenith angle of arrival (ZoA) data, zenith angle of departure (ZoD) data, position data, velocity data, channel information, quasi co-location (QCL) data, Doppler spread data, Doppler shift data, delay profile data, delay spread data, or a combination thereof.

In a fortieth aspect, alone or in combination with one or more of the thirty-eighth through thirty-ninth aspects, the first UE estimates, a position of the first UE based on the information received from the one or more neighbor UEs.

In a forty-first aspect, alone or in combination with one or more of the thirty-eighth through fortieth aspects, the first UE estimates a speed of the first UE based on the information received from the one or more neighbor UEs.

In a forty-second aspect, alone or in combination with one or more of the thirty-eighth through forty-first aspects, the first UE predicts one or more candidate beams of the base station based on the information received from the one or more neighbor UEs.

In a forty-third aspect, alone or in combination with one or more of the thirty-eighth through forty-second aspects, the first UE predicts a candidate channel for communicating with the base station based on the information received from the one or more neighbor UEs.

In some aspects, an apparatus (e.g., a first UE) may be configured establish one or more sidelink connections with one or more neighbor UEs of the first UE. The apparatus may also be configured to request, to the one or more neighbor UEs via the one or more sidelink connections, information from the one or more neighbor UEs. The apparatus may further be configured to perform one or more operations based on the information received from the one or more neighbor UEs. In some implementations, the apparatus includes a wireless device, such as a UE (e.g., the first UE). In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a forty-fourth aspect, requesting the information includes transmitting, from the first UE to the one or more neighbor UEs via the one or more sidelink connections, one or more information requests and receiving, at the first UE from the one or more neighbor UEs via the one or more sidelink connections, the information.

In a forty-fifth aspect, alone or in combination with the forty-fourth aspect, the one or more information requests are transmitted via a physical sidelink control channel (PSCCH) or one or more medium access control (MAC) control elements (MAC CEs).

In a forty-sixth aspect, alone or in combination with one or more of the forty-fourth through forty-fifth aspects, the information is received at the first UE via a physical sidelink control channel (PSCCH), a physical sidelink shared channel (PSSCH), or both.

In a forty-seventh aspect, alone or in combination with the forty-sixth aspect, the information is received in a particular information element of one or more radio resource control (RRC) messages.

In a forty-eighth aspect, alone or in combination with the forty-sixth aspect, the information is received in a particular information element of one or more downlink control information (DCI) messages.

In a forty-ninth aspect, alone or in combination with one or more of the forty-fourth through forty-eighth aspects, the information includes beam selection data, angle of arrival (AoA) data, angle of departure (AoD) data, zenith angle of arrival (ZoA) data, zenith angle of departure (ZoD) data, position data, velocity data, channel information, quasi co-location (QCL) data, Doppler spread data, Doppler shift data, delay profile data, delay spread data, or a combination thereof.

In a fiftieth aspect, alone or in combination with one or more of the forty-fourth through forty-ninth aspects, performing the one or more operations includes estimating, at the first UE, a position of the first UE based on the information received from the one or more neighbor UEs.

In a fifty-first aspect, alone or in combination with one or more of the forty-fourth through fiftieth aspects, performing the one or more operations includes estimating, at the first UE, a speed of the first UE based on the information received from the one or more neighbor UEs.

In a fifty-second aspect, alone or in combination with one or more of the forty-fourth through fifty-first aspects, performing the one or more operations includes predicting, at the first UE, one or more candidate beams of a base station based on the information received from the one or more neighbor UEs.

In a fifty-third aspect, alone or in combination with one or more of the forty-fourth through fifty-second aspects, performing the one or more operations includes predicting, at the first UE, a candidate channel for communicating with a base station based on the information received from the one or more neighbor UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 may include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein. For example, operations of the methods described with respect to FIGS. 6-10 may be executed in a different order or combined with operations of others of the methods of FIGS. 6-10.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enables to transfer a computer program from one place to another. A storage media may be any available media that can be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that can be used to store desired program code in the form of instructions or data structures and that can be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. An apparatus configured for wireless communication, the apparatus comprising:
   at least one processor; and
   a memory coupled to the at least one processor,
   wherein the at least one processor is configured to:
      receive, at a base station from a first user equipment (UE), an information request corresponding to one or more neighbor UEs of the first UE;
      identify, by the base station and based on the information request, a subset of UEs served by the base station that include the one or more neighbor UEs of the first UE;
      transmit, from the base station to the subset of UEs, one or more requests for information corresponding to the one or more neighbor UEs of the first UE;
      receive, at the base station from the subset of UEs, one or more responses, wherein the one or more responses include information responsive to the one or more requests for information; and
      transmit, from the base station to the first UE, an information package that includes the information.

2. The apparatus of claim 1, wherein the information comprises angle of arrival (AoA) data, angle of departure (AoD) data, zenith angle of arrival (ZoA) data, zenith angle of departure (ZoD) data, quasi co-location (QCL) data, Doppler spread data, Doppler shift data, delay profile data, delay spread data, or a combination thereof.

3. The apparatus of claim 1, wherein, to receive the one or more responses, the at least one processor is configured to receive the one or more responses via a physical uplink shared channel (PUSCH), a physical uplink control channel (PUCCH), or a combination thereof, and wherein the one or more responses comprise one or more radio resource control (RRC) messages, one or more uplink control information (UCI) messages, or one or more medium access control (MAC) control elements (MAC CEs).

4. The apparatus of claim 1, wherein the at least one processor is further configured to:
   select, at the base station and based on geographic information, the subset of UEs from a plurality of UEs served by the base station; and
   determine, at the base station, the geographic information based on communication beams corresponding to the subset of UEs and the first UE, trajectories of the subset of UEs and the first UE, or a combination thereof.

5. The apparatus of claim 1, wherein the at least one processor is further configured to:
   select, at the base station and based on geographic information, the subset of UEs from a plurality of UEs served by the base station; and
   request, at the base station, the geographic information from a core network component, wherein the core network component comprises a location management function (LMF) or a position server.

6. The apparatus of claim 1, wherein the at least one processor is further configured to:
   select, at the base station and based on geographic information, the subset of UEs from a plurality of UEs served by the base station; and
   request, at the base station, the geographic information from the subset of UEs.

7. The apparatus of claim 1, wherein, to transmit the information package, the at least one processor is configured to transmit the information package via a physical downlink shared channel (PDSCH), a physical downlink control channel (PDCCH), or both, and wherein the information package comprises one or more radio resource control (RRC) messages, one or more downlink control information (DCI) messages, or a combination thereof.

8. The apparatus of claim 1, wherein the at least one processor is further configured to:
receive, at the base station from the first UE, a negative-acknowledgement (NACK); and
reschedule, at the base station, transmission of the information package to the first UE.

9. The apparatus of claim 1, wherein, to identify the subset of UEs, the at least one processor is configured to identify, by the base station and based on the information request, the subset of UEs based on geographic information determined by the base station from the information.

10. An apparatus configured for wireless communication, the apparatus comprising:
at least one processor; and
a memory coupled to the at least one processor,
wherein the at least one processor is configured to:
initiate transmission, from a first user equipment (UE) to a base station, of an information request corresponding to one or more neighbor UEs of the first UE; and
receive, at the first UE from the base station, an information package that includes information corresponding to the one or more neighbor UEs of the first UE, wherein the information is received by the base station in response to transmission of one or more requests for information corresponding to the one or more neighbor UEs of the first UE, the one or more neighbor UEs identified by the base station based on the information.

11. The apparatus of claim 10, wherein the information comprises angle of arrival (AoA) data, angle of departure (AoD) data, zenith angle of arrival (ZoA) data, zenith angle of departure (ZoD) data, quasi co-location (QCL) data, Doppler spread data, Doppler shift data, delay profile data, delay spread data, or a combination thereof.

12. The apparatus of claim 10, wherein the at least one processor is further configured to estimate, at the first UE, a position of the first UE based on the information included in the information package.

13. The apparatus of claim 10, wherein the at least one processor is further configured to estimate, at the first UE, a speed of the first UE based on the information included in the information package.

14. The apparatus of claim 10, wherein the at least one processor is further configured to predict, at the first UE, one or more candidate beams of the base station based on the information included in the information package.

15. The apparatus of claim 10, wherein the at least one processor is further configured to predict, at the first UE, a candidate channel for communicating with the base station based on the information included in the information package.

16. An apparatus configured for wireless communication, the apparatus comprising:
at least one processor; and
a memory coupled to the at least one processor,
wherein the at least one processor is configured to:
receive, at a base station from a first user equipment (UE), an information request corresponding to one or more neighbor UEs of the first UE;
identify, at the base station and responsive to receipt of the information request, a subset of UEs served by the base station that include the one or more neighbor UEs of the first UE; and
transmit, from the base station to the first UE, a list of the one or more neighbor UEs to enable sidelink communications between the first UE and the one or more neighbor UEs.

17. The apparatus of claim 16, wherein, to receive the information request, the at least one processor is configured to receive the information request via a physical uplink control channel (PUCCH) or one or more medium access control (MAC) control elements (MAC CEs), wherein the list is transmitted to the first UE via a physical downlink shared channel (PDSCH), a physical downlink control channel (PDCCH), or both, and wherein the list is included in a particular information element of one or more radio resource control (RRC) messages or a particular information element of one or more downlink control information (DCI) messages.

18. The apparatus of claim 16, wherein, to identify the subset of UEs, the at least one processor is configured to identify the one or more neighbor UEs based on communication beams corresponding to the subset of UEs and the first UE, trajectories of the subset of UEs and the first UE, or a combination thereof.

19. The apparatus of claim 16, wherein, to identify the subset of UEs, the at least one processor is further configured to:
request, at the base station, geographic information corresponding to the first UE and UEs served by the base station from a core network component; and
identify the subset of UEs based on the geographic information.

20. The apparatus of claim 16, wherein, to identify the subset of UEs, the at least one processor is further configured to:
request geographic information from the UEs served by the base station; and
identify the subset of UEs based on the geographic information.

21. The apparatus of claim 16, wherein the at least one processor is further configured to:
receive, at the base station from the first UE, a negative-acknowledgement (NACK); and
reschedule, at the base station, transmission of the list to the first UE.

22. An apparatus configured for wireless communication, the apparatus comprising:
at least one processor; and
a memory coupled to the at least one processor,
wherein the at least one processor is configured to:
initiate transmission, from a first user equipment (UE) to a base station, of an information request corresponding to one or more neighbor UEs of the first UE, wherein the information is received by the base station in response to transmission of requests to the one or more neighbor UEs identified by the base station based on the information;
receive, at the first UE from the base station, a list of the one or more neighbor UEs of the first UE; and
establish, at the first UE, one or more sidelink connections with the one or more neighbor UEs.

23. The apparatus of claim 22, wherein, to transmit the information request, the at least one processor is configured to transmit the information request via a physical uplink control channel (PUCCH), and wherein, to receive the list, the at least one processor is configured to receive the list via a physical downlink shared channel (PDSCH), a physical downlink control channel (PDCCH), or both.

24. The apparatus of claim 22, wherein the at least one processor is further configured to:
- initiate transmission, from the first UE to the one or more neighbor UEs via the one or more sidelink connections, of one or more information requests; and
- receive, at the first UE from the one or more neighbor UEs via the one or more sidelink connections, information corresponding to the one or more information requests.

25. The apparatus of claim 22, wherein the information comprises angle of arrival (AoA) data, angle of departure (AoD) data, zenith angle of arrival (ZoA) data, zenith angle of departure (ZoD) data, quasi co-location (QCL) data, Doppler spread data, Doppler shift data, delay profile data, delay spread data, or a combination thereof.

26. The apparatus of claim 22, wherein the at least one processor is further configured to estimate, at the first UE, a position of the first UE based on the information received from the one or more neighbor UEs.

27. The apparatus of claim 22, wherein the at least one processor is further configured to estimate, at the first UE, a speed of the first UE based on the information received from the one or more neighbor UEs.

28. The apparatus of claim 22, wherein the at least one processor is further configured to predict, at the first UE, a candidate channel for communicating with the base station based on the information received from the one or more neighbor UEs.

29. The apparatus of claim 22, wherein the at least one processor is further configured to establish the one or more sidelink connections without assistance from the base station.

* * * * *